US008380621B1

(12) United States Patent
Bent et al.

(10) Patent No.: US 8,380,621 B1
(45) Date of Patent: Feb. 19, 2013

(54) SYSTEMS, METHODS AND PROGRAM PRODUCTS FOR SWAP PROCESSING FOR UNINSURED ACCOUNTS

(75) Inventors: Bruce Bent, Manhasset, NY (US);
Bruce Bent, II, Manhasset, NY (US);
Arthur Bent, New York, NY (US)

(73) Assignee: Island Intellectual Property LLC, Manhasset, NY (US)

( * ) Notice: Subject to any disclaimer, the term of this patent is extended or adjusted under 35 U.S.C. 154(b) by 968 days.

(21) Appl. No.: 12/025,402

(22) Filed: Feb. 4, 2008

Related U.S. Application Data

(60) Provisional application No. 61/025,553, filed on Feb. 1, 2008, provisional application No. 60/895,320, filed on Mar. 16, 2007, provisional application No. 60/892,107, filed on Feb. 28, 2007.

(51) Int. Cl.
*G06Q 40/00* (2006.01)
(52) U.S. Cl. ............... 705/39; 705/35; 705/36; 705/37; 705/38; 705/40
(58) Field of Classification Search ............ 705/35, 705/36, 37, 38, 39, 40
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |
| 4,597,046 A | 6/1986 | Musmanno et al. | |
| 4,674,044 A | 6/1987 | Kalmus et al. | |
| 4,694,397 A | 9/1987 | Grant et al. | |
| 4,700,297 A | 10/1987 | Hagel et al. | |
| 4,751,640 A | 6/1988 | Lucas et al. | |
| 4,774,663 A | 9/1988 | Musmanno et al. | |
| 4,953,085 A | 8/1990 | Atkins | |
| 4,985,833 A | 1/1991 | Oncken | |
| 5,126,936 A | 6/1992 | Champion et al. | |
| 5,206,803 A | 4/1993 | Vitagliano et al. | |
| 5,220,501 A | 6/1993 | Lawlor et al. | |
| 5,235,507 A | 8/1993 | Sackler et al. | |
| 5,262,942 A | 11/1993 | Earle | |
| 5,270,922 A | 12/1993 | Higgins | |

(Continued)

FOREIGN PATENT DOCUMENTS

JP  10-049590  2/1998
WO  WO-95/23379  8/1995

(Continued)

OTHER PUBLICATIONS

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).

(Continued)

*Primary Examiner* — Nga B. Nguyen
(74) *Attorney, Agent, or Firm* — Foley & Lardner LLP

(57) ABSTRACT

A method, system and program product, the method comprising: accessing in the performance of steps databases, comprising: aggregated deposit account information for a plurality of FDIC-insured and interest-bearing aggregated deposit accounts in first plurality of banks; client account information; accessing first client transaction data; determining total amounts of funds for a second plurality of banks; determining a set of client accounts having small balances; allocating funds of client accounts among the second plurality of the banks to match the respective total amounts set for the second plurality of banks, the allocating comprising allocating the small balance client accounts to force a distribution of respective of the client accounts; determining transfer information for funds from the one or more of the aggregated deposit accounts; receiving second transaction files; reallocating funds of client accounts among to match the respective total amounts set for the second plurality of the banks.

20 Claims, 7 Drawing Sheets

U.S. PATENT DOCUMENTS

| | | | |
|---|---|---|---|
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,505,937 B2 | 3/2009 | Dilip et al. |
| 7,509,286 B1 | 3/2009 | Bent et al. |
| 7,519,551 B2 | 4/2009 | Bent et al. |
| 7,529,709 B2 | 5/2009 | Volchek et al. |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,860,771 B2 | 12/2010 | Colvin |
| 7,873,571 B1 | 1/2011 | Wehmer |
| 7,873,573 B2 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0080185 A1 | 5/2003 | Werther |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |

| | | | |
|---|---|---|---|
| 2004/0107157 | A1 | 6/2004 | Bleunven et al. |
| 2004/0111361 | A1 | 6/2004 | Griffiths et al. |
| 2004/0128229 | A1 | 7/2004 | Raines et al. |
| 2004/0128235 | A1 | 7/2004 | Kemper et al. |
| 2004/0138974 | A1 | 7/2004 | Shimamura et al. |
| 2004/0153398 | A1 | 8/2004 | Baumgartner et al. |
| 2004/0162773 | A1 | 8/2004 | Del Rey et al. |
| 2004/0177036 | A1 | 9/2004 | Nutahara et al. |
| 2004/0249741 | A1 | 12/2004 | Understein |
| 2005/0044038 | A1 | 2/2005 | Whiting et al. |
| 2005/0091137 | A1 | 4/2005 | Woeber |
| 2005/0102225 | A1 | 5/2005 | Oppenheimer et al. |
| 2005/0102226 | A1 | 5/2005 | Oppenheimer et al. |
| 2005/0108120 | A1 | 5/2005 | Malka et al. |
| 2005/0108149 | A1 | 5/2005 | Bent et al. |
| 2005/0114246 | A1 | 5/2005 | Coloma |
| 2005/0154662 | A1 | 7/2005 | Langenwalter |
| 2005/0228733 | A1 | 10/2005 | Bent et al. |
| 2006/0047593 | A1 | 3/2006 | Naratil et al. |
| 2006/0106703 | A1 | 5/2006 | Del Rey et al. |
| 2006/0155644 | A1 | 7/2006 | Reid et al. |
| 2006/0167773 | A1 | 7/2006 | Yang et al. |
| 2006/0212389 | A2 | 9/2006 | Bent et al. |
| 2006/0213980 | A1 | 9/2006 | Geller et al. |
| 2006/0273152 | A1 | 12/2006 | Fields |
| 2007/0043666 | A1 | 2/2007 | Burdette |
| 2007/0118449 | A1 | 5/2007 | De La Motte |
| 2007/0130065 | A1 | 6/2007 | Staab et al. |
| 2007/0143196 | A1 | 6/2007 | Colvin |
| 2007/0255655 | A1 | 11/2007 | Kemper et al. |
| 2007/0271174 | A2 | 11/2007 | Bent et al. |
| 2007/0276752 | A1 | 11/2007 | Whiting et al. |
| 2007/0288400 | A1 | 12/2007 | Menon |
| 2008/0015985 | A1 | 1/2008 | Abhari et al. |
| 2008/0046358 | A1 | 2/2008 | Holm-Blagg et al. |
| 2008/0065532 | A1 | 3/2008 | De La Motte |
| 2008/0097899 | A1 | 4/2008 | Jackson et al. |
| 2008/0120228 | A1 | 5/2008 | Bent et al. |
| 2008/0133280 | A1 | 6/2008 | Ziegler |
| 2008/0133396 | A1 | 6/2008 | De La Monte |
| 2008/0222053 | A1 | 9/2008 | Jacobsen |
| 2008/0288398 | A1 | 11/2008 | Maricondi |
| 2009/0006985 | A1 | 1/2009 | Fong et al. |
| 2009/0012899 | A1 | 1/2009 | Friesen |
| 2009/0138412 | A1 | 5/2009 | Jacobsen |
| 2009/0327154 | A1 | 12/2009 | Van Vooren et al. |
| 2011/0106703 | A1 | 5/2011 | Jay et al. |
| 2011/0208640 | A1 | 8/2011 | Geoghegan et al. |
| 2011/0246359 | A1 | 10/2011 | O'Brien et al. |

FOREIGN PATENT DOCUMENTS

| | | |
|---|---|---|
| WO | WO-99/18529 | 4/1999 |
| WO | WO-02/42952 | 5/2002 |
| WO | WO-03/012580 | 2/2003 |
| WO | WO-2005/006111 | 1/2005 |

OTHER PUBLICATIONS

Lawsuit by *Island Intellectual Property LLC, et al.* v. *Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
2 CDs (1) Non-Confidential Exhibits and Material regarding Deutsch Bank Trust Company Americas' (DBTCA) 2nd Supp Res to Double Rock's Interrogatory No. 2; (2) Prior Art for IC Non-Confidential Material—Bates-numbered documents for Exhibits 2, 5, 8, 9, and 10 Invalidity Charts, Jul. 2010.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccount$^{SM}$ and Insurance Plus Service Agreement, attached Schedule A (List of Banks Participating in the Insurance Plus Service), IMAD Mar. 1994, 3 pages.
Investors Money Accounts$^{SM}$ (an FDIC-insured money market account), IMA-1 (Mar. 1994), 4 pages.
Investors MoneyAccount$^{SM}$, "The FDIC-Insured Money Market Investment with an Important Plus," IMA Oct. 1995, 2 pages.
1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services the Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
USPTO Office Action, Office Action Summary, U.S. Appl. No. 11/767,827, Date Mailed Jun. 5, 2009, 35 pages.
Service Mark Application, Applicant: Reserve Management Corporation, Mark: RESERVE INSURED DEPOSITS, (attached Power of Attorney, Declaration, Drawing Page, Sep. 21, 2001, 6 pages.
Letter to R.L. Kratzer, from T.J. Vezeau, Re: United States Patent No. 6,374,231, dated Jan. 10, 2003, 1 page.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Letter to R.L. Kratzer, from T.J. Vezeau, Re: United States Patent No. 6,374,231, dated Jan. 10, 2003 (with various attachments), 128 pages.

Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Ralph, Customer Service, from Bruce Bent II, Re: Reserve IDA, Sep. 4, 1997, 1 page.
Memo to Marianne, Pat, Bruce Bent, from Bruce Bent II, Re: Reserve Insured Deposit Account, Sep. 4, 1997, 1 page.
American Express—Meeting Notes, Sep. 26, 2000, 2 pages.
American Express Financial Advisors Customized FDIC Product with Tiered Balances, Jan. 24, 2001, 2 pages.
American Express Conference Call Minutes, Topic: Tiered Balances, Jan. 25, 2001 @ 3:00pm-4:00pm, 2 pages.
Letter to A.J. Bufalino, from C.R. Macedo, Re: Reserve Management Corporation, Wayne Hummer Investments LLC, May 8, 2007, (enclosing Jan. 3, 2006 letter to A.J. Bufalino, Feb. 23, 2006 letter to A.J. Bufalino, Mar. 16, 2006 letter to C. Macedo, U.S. Patent No. 6,374,231, U.S. Publication No. 2002/0091637 A1, U.S. Publication No. 2005/0108149 A1, U.S. Publication No. 2005/0228733 A1, U.S. Publication No. 2006/0212385 A2, U.S. Publication No. 2006/0212389 A2), 510 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Programs$^{SM}$, (attached Q&A: Important Information about the New Salomon Smith Barney Bank Deposit Program), Aug. 16, 2020, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/lawskules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Aryan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, Lexsee 51 FR 9632, "Definition of Deposit and Technical Amendments," Action: Final Rule, Mar. 20, 1986, 13 pages.

Federal Reserve System, Lexsee 56 FR 15494, "Regulation D-Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, Lexsee 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
American Express—Meeting Notes Sep. 26, 2000, 2 pages.
American Express Conference Call Minutes, Jan. 25, 2001 @ 3:00pm-4:00pm, Topic: Tiered Balances, 2 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builders$^{SM}$ Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
Litigation Notice After Payment of Issue Fee filed in Parent U.S. Appl. No. 10/382,946, Apr. 3, 2009, 160 pages.
Dreyfus Insured Deposit Program Disclosure Statement and Terms and Conditions, 12 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
U.S. Appl. No. 12/025,402, filed Feb. 4, 2008, Bent.

Lawsuit by Island Intellectual Property LLC against First Southwest Company; Complaint for Patent Infringement; Civil Action No. 1:11-cv-00371-UNA; Apr. 26, 2011; 42 pages.

Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,772, 7,672,886; and 7,680,734; and Exhibits A-R; Civil Action No. 09 Civ.2675(VM)(AJP), Oct. 28, 2010; 1.119 pages.

Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No.: 09 Civ. 2675 (VM)(AJP); Nov. 23, 2010; 192 pages. The redacted items were designated as confidential in a Protective Order in the case.

Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ.2675 (VM)(AJP); Nov. 23, 2010; 107 pages.

U.S. Appl. No. 60/307,815, filed Jul. 27, 2001.

U.S. Appl. No. 60/323,365, filed Sep. 20, 2001.

AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.

AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.

AB 2011 Assembly Bill—Chaptered, http://www.leginfo.ca.gov/pub/bill/asm/ab_2001-2050/ab_2011_bill_20060925_chaptered.html, 2006, pp. 1-3.

AB 2011 Assembly Bill—Enrolled, http://www.leginfo.ca.gov/pub/bill/asm/ab_2001-2050/ab_2011_bill_20060816_enrolled.html, 2006, pp. 1-3.

AB 2011 Assembly Bill—History, Complete Bill History, http://www.leginfo.ca.gov/pub/bill/asm/ab_2001-2050/ab_2011_bill_20060925_history.html, 2006, p. 1.

About iMoneyNet, Inc., About iMoneyNet's Money Funds Division, 4 Sheets, Aug. 21, 2003, http://www.ibcdata.com/about.htm.

Announcing Changes in Automatic "Sweep" Investment Options, LPL Financial Services, Linsco/Private Ledger, Member NASD/SIPC, 26 Sheets.

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Bent, "Bruce Bent Makes Money Market Funds Act Like Bank Accounts," Equity BBDP, Oct. 5, 1998, 3 Sheets.

Blackwell, "ABA to Approve System for Sharing Deposit Coverage," American Banker, 2 Sheets, Feb. 11, 2003.

Blackwell, "New Pitch: Deposit Insurance Sharing," American Banker Online, 4 Sheets, Jan. 21, 2003.

Britt, "Struggling with Sweep Accounts," America's Community Banker, vol. 6, No. 12, 11 Sheets, Dec. 1, 1997.

California Independent Bankers, ICBA Independent Community Bankers of America, Banker Bulletin, 2006, CIB 16th Annual Convention, vol. 4, issue 6, http://www.cib.org/banker_bulletin.htm.

Capital Briefs: Corporate Checking Account Relief Sought, American Banker, vol. 162, Jul. 28, 1997, 1 Sheet.

Certificate of Deposit Registry Service: Keeping Deposits in the Corn Patch, Banknews, 2 Sheets. Mar. 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Chapelle, "Merrill's Rivals Say They, Too. Offer Services Beyond Banking," Securities Data Publishing on Wall Street, 2 Sheets, Feb. 1, 2003.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Declaration of Mr. Bruce Bent II, Vice Chairman and Registrant of Applicant. (3 Sheets) and Exhibits A, B, C and D (6 Sheets).

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Heavyweight Funding, Bankers News, Mar. 4, 2003, vol. II, Issue No. 5, 2 Sheets.

Hoffman, "Reserve's FDIC-Insured Account Draws Regionals; But some see little need for insurance," Crain Communications Inc., Investment News, 2 Sheets, Jun. 4, 2001.

Insured Cash Account Program Disclosure Booklet, LPL Financial Services, Linsco/Private Ledger, Member NASD/SIPC.

Keenan, "Tapping Brokerages for Alternative to CDs," American Banker, The Financial Services Daily, 3 Sheets, Feb. 18, 2004.

Lavine, "Check Out High-Yield Checking Accounts," Broward Daily Business Review, vol. 39, No. 102, 2 Sheets, Apr. 27, 1998.

Liberman et al., Market Watch, "How Important are Banks?" FDIC Insurance on Deposits Just One Continuing Advantage, Oct. 17, 2006, 3 Sheets.

McReynolds et al. "Unusual Products for Unusual Times," Securities Data Publishing on Wall Street, 6 Sheets, May 1, 2001.

McReynolds, "The Power of CASH: Ho-hum cash can be great product (and lead to more business) in troubled times," Securities Data Publishing on Wall Street, 3 Sheets, Jun. 1, 2002.

Money Fund Report, IBC Financial Data, Inc., Nov. 6, 1998, 1 Sheet.

Mutual Funds Magazine, Bargain Basement Funds, Oct. 1997, 1 Sheet.

Mutual Funds Magazine, Bargain Basement Funds, Oct. 1997, 2 Sheets.

News Article: "Regulators Support Demand Deposit Bill", Regulatory Compliance Watch—Mar. 9, 1998; 2 Sheets, vol. 9, No. 10.

Potter, "As Sweep Accounts Continue to Grow, So do Community Bank Options," America's Community Banker, vol. 9, Issue 8, Bell & Howell Information and Learning Company, 3 Sheets, Aug. 1, 2000.

Promontory Interfinancial Network: http://www.promnetwork.com/index.html, 2003.

Reserve Insured Deposits, United States Patent and Trademark Office, Reg. No. 2,694,910, Registered Mar. 11, 2003, 1 Sheet.

Reserve Management Corporation, Reserve Insured Deposits, U.S. Appl. No. 76/315,600, Issued.

Share, "New Service Skirts FDIC's $100K Limit," Dialog Web Command Mode, 2 Sheets, Jun. 13, 2003, http://www.dialogweb.com/cgi/dwclient.

Smith, "IBAA Won't Push Interest-Bearing Checking for Business; Says Too Few Members Want It," The American Banker, 2 Sheets, Apr. 18, 1996.

Stafford, "New Bank Program Allows $1 Million in Insured Deposits," Dialog Web Command Mode, 3 Sheets, Aug. 24, 2003, http://www.dialogweb.com/cgi/dwclient.

The Reserve Fund, Study of U.S. Patent No. 6,374,231, 1 Sheet.

The Reserve Funds Press Release, "The Reserve Funds and Frontier Bank Partner to Offer Revolutionary Banking Product," 5 Sheets, Aug. 1, 2000.

The Reserve, "Company History," 3 Sheets, Oct. 4, 2006, http://www.ther.com/aboutus/history.shtml.

The Reserve, "Reserve Insured Deposits Program," 2 Sheets, Oct. 4, 2006, http://www.ther.com/bank/bank_insdep.shtml.

The Reserve, "Reserve Insured Deposits," 2 Sheets, Oct. 4, 2006, http://www.ther.com/ps/ps_fif.shtml.

The Reserve, "What Sets Us Apart," 2 Sheets, Oct. 4, 2006, http://www.ther.com/bank/bank_wsua.shtml.

Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.

"Bank of Oak Ridge to Offer FDIC Insurance on up to $1.5 Million," Dialog Web Command Mode, 2 Sheets, Sep. 25, 2003, http://www.dialogweb.com/cgi/dwclient.

"Man Bites Dog: Funds Move Into Banking," IBC's Money Fund Selector, 2 Sheets, Nov. 6, 1998.

"Reverse Ups Insurance Limit on Money Market Account," Thomson Financial Inc., Mutual Fund Market News, 1 Sheet, Aug. 26, 2002.

"The Bank of New York adds a $300,000 FDIC-Insured Money Market Account Option to its Dividend Income Checking Account," PR Newswire Associations, Inc., PR Newswire, 2 Sheets, Apr. 18, 2002.

"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.

Letter From William W. Wiles, Secretary of the Board, Board of Governors of the Federal Reserve System, Jun. 22, 1983, 6 Sheets.

DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

Letter from Michael Bradfield, General Counsel, Board of Governors of the Federal Reserve System, Nov. 16, 1984, 4 Sheets.

Board of Governors of the Federal Reserve System, 1984 Fed. Res. Interp. Ltr. Lexis 56, Nov. 16, 1984, 3 Sheets.

Letter From Oliver I. Ireland, Associate General Counsel, Board of Governors of the Federal Reserve System, Jun. 22, 1988, 5 Sheets.

Board of Governors of the Federal Reserve System, 1988 Fed. Res. Interp. Ltr. Lexis 141, Jun. 22, 1988, 3 Sheets.

Board of Governors of the Federal Reserve System, 1989 Fed. Res. Interp. Ltr. Lexis 77, Mar. 14, 1989, 2 Sheets.

Board of Governors of the Federal Reserve System, 1989 Fed. Res. Interp. Ltr. Lexis 154, Jun. 21, 1989, 2 Sheets.

Board of Governors of the Federal Reserve System, 1990 Fed. Res. Intern. Ltr. Lexis 94, Feb. 1, 1990, 1 Sheet.

Board of Governors of the Federal Reserve System, 1991 Fed. Res. Interp. Ltr. Lexis 232, Jan. 30, 1991, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

Board of Governors of the Federal Reserve System, 1994 Fed. Res. Interp. Ltr. Lexis 156, Jun. 24, 1994, 3 Sheets.

CMA, Insured Savings Account Fact Sheet, Merrill Lynch, Pierce, Fenner & Smith Incorporated, Jul. 1994, pp. 47-54.

Board of Governors of the Federal Reserve System, 1994 Fed. Res. Interp. Ltr. Lexis 314, Oct. 17, 1994, 2 Sheets.

Board of Governors of the Federal Reserve System, 1994 Fed. Res. Interp. Ltr. Lexis 419, Oct. 14, 1994, 4 Sheets.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

Letter from Stephanie Martin, Assoc. General Counsel, Board of Governors of the Federal Reserve System, Apr. 22, 2004, 8 Sheets.

Bank Deposit Program, Online http://web.archive.org/web/20030620100115/http:/www.smithbarney.com/products_servi, Jan. 19, 2001, 4 Sheets.

Letter From Jamey Basham, Attorney, LEXSEE 1990 FDIC Intern. Ltr., Lexis 1, Federal Deposit Insurance Corporation, FDIC-90-02, Jan. 3, 1990, 2 Sheets.

Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No—Act., Lexis 1593, Securities Exchange Act of 1934—Section 15(a), 11 Sheets.

The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.

FDIC Federal Register Citations: Email from Bert Ely to Comments, Mar. 8, 2006, Subject: Large-Bank Deposit Insurance Determination Proposal-RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

Letter to Mr. Jonathan L. Levin, Esq., From Oliver Ireland, Associate General Counsel, Oct. 18, 1996, 2 Sheets.

Letter to Mr. L.P. Fleming, Jr., Esq., From Oliver Ireland, Associate General Counsel, Feb. 7, 1995, 3 Sheets.

Letter to Mr. James E. Creekman, Group Vice President, From Oliver Ireland, Associate General Counsel, Aug. 1, 1995, 4 Sheets.

Letter to Ms. Brenda L. Skidmore, Senior Vice President, From Oliver Ireland, Associate General Counsel, Aug. 30, 1995, 4 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.

Wayne Hummer Money Market Fund Brochure, Performance Data as of Mar. 31, 2003, including Commentary page (attached http://www.whummer.com/funds/money.asp and http://www.whummer.com/fund dis.htm), 4 pages.

Wayne Hummer Money Market Fund, "Annual Financial Statements," Mar. 31, 2003, 12 pages.

Wayne Hummer Investment Trust, Investment Company Act File No. 811-3880, "Start Investing Today . . . ," Prospectus, Jul. 31, 2002, 44 pages.

Wayne Hummer Management Company, retrieved from the Internet: "Organization & Clients," http://www.whmgmtco.com; "Assets Under Management—Dec. 31, 2002," http://www.whmgmtco.com/asset.htm; "Equity & Mid Cap Growth Investment Philosophy," http://www.whmgmtco.com/equ-phil.htm; "Economic & Market Commentary—Jan. 2003," http://www.whmgmtco.com/commentary.htm; "Management Team," http://www.whmgmtco.com/team.htm; "Fixed Income Performance," http://www.whmgmtco.com/fixedperf.htm; "Mid-Cap Equity Performance," http://www.whmgmtco.com/mid-perf.htm; "All Equity Performance," http://www.whmgmtco.com/all-perf.htm, 11 pages [retrieved on Jul. 2, 2003].

Wayne Hummer Market Letter, Jul./Aug. 2003, 2 pages.

Wayne Hummer Investments, "Wintrust Financial Corporation Reports Second Quarter Earnings; Second Quarter Net Earnings Up 45%," Jul. 18, 1 page.

Weber Shandwick Worldwide, News: for Immediate Release, "Wayne Hummer Investments Names New President & CEO," Apr. 2003, 2 pages.

Wayne Hummer Investments, retrieved from the Internet: "Our People Focused on Your Investments," Jul. 2, 2003, http://www.whummer.com/; "Stocks & Bonds," http://www.whummercom/stocks_bonds.htm; "Mutual Funds," http://www.whummercom/mutual_funds.htm; "Morning Comments," http://www.whummercom/momingcomments.asp, 6 pages [retrieved on Jul. 2, 2003].

Wayne Hummer Investments, "Investment Executives," retrieved from the Internet: http://www.whummer.com/investment_executives.htm, 2 pages [retrieved on Jul. 2, 2003].

Wayne Hummer Investments LLC, "Consolidated Statement of Financial Condition," with Report of Independent Auditors, Dec. 31, 2002, 12 pages.

Wintrust Financial Corporation, "Wintrust Financial Corporation Reports Record Earnings for the Fourth Quarter and Year; Fourth Quarter Net Earnings Up 53%," 22 pages.

Wayne Hummer Investments, "A Letter to Wayne Hummer Investments Clients & Friends," Jul. 18, retrieved from the Internet: http://www.whummer.com/wintrust2qEarnings.html, 1 page [retrieved on Jul. 3, 2003].

Wayne Hummer Investments; Insured Bank Deposits Program—Frequently Asked Questions; obtained Dec. 26, 2002; 4 pages.
Wayne Hummer Investments, "Contact Us," retrieved from the Internet: http://www.waynehummer.com/contact_us.htm, 6 pages [retrieved on Jan. 8, 2003].
Wayne Hummer Investments for Life, Booklet, 2003, 25 pages.
Wayne Hummer, "For Time-Proven Professionalism," Booklet, 2003, 13 pages.
Wayne Hummer, "Insured Bank Deposits™ Program Information Statement," obtained Dec. 26, 2002; 12 pages.
U.S. Appl. No. 12/453,390, filed May 8, 2009, Bruce Bent.
Lawsuit by *Island Intellectual Property LLC, et al. v. Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.
Lawsuit by *Island Intellectual Property LLC, et al. v. Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.
Lawsuit by *Island Intellectual Property LLC, et al. v. Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.
Lawsuit by *Island Intellectual Property LLC, et al. v. Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC, et al. v. Deutsche Bank Trust Company Americas, et al.*; Order; Dec. 7, 2011; Case 1:09-cv-02675-VM, Document 212.
Lawsuit by *Island Intellectual Property LLC, et al. v. Deutsche Bank Trust Company Americas, et al.*; Special Master's Report and Recommended Decision on Defendants' Summary Judgment Motion of Invalidity Under 35 U.S.C. § 101; Dec. 19, 2011.
Lawsuit by *Island Intellectual Property LLC, et al. v. Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al. v. Deutsche Bank Trust Co., et al.*; Nov. 28, 2011; Case 1:09-cv-02675-VM; Document 211.
Martens, Don W.; letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.
Lawsuit by Promontory Interfinancial Network, LLC against Double Rock Corporation p/k/a Reserve Management Corporation, Complaint, Mar. 24, 2009, Civil Action No. 1:09 CV 316.
Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.
12 CFR Part 329—Interest on Deposit, Source: 51 FR 10808, Mar. 31, 1986, 5 Sheets.
CMA, Insured Savings Account Fact Sheet, Merrill Lynch, Pierce, Fenner & Smith Incorporated, 1997, pp. 49-57.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Merrill Lynch, Pierce, Fenner & Smith Incorporated, Jan. 1997, 35 Sheets.
Deposit Growth Strategies for Financial Institutions, New Sweep Account Helps Retain $40 Million in Business Deposits, vol. 7, No. 12, The Reserve Funds, May 2001, 1 Sheet.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
FINISTAR, Providing FDIC Insured Funds as a Stable Source of Deposits to Commercial Banking Institutions, 16 Sheets, www.Finistar.com.
Frost Bank, Member FDIC, Checking Accounts, 1 Sheet, Sep. 19, 2003, https://www.frostbank.com/cgi-bin/ecommffrost1/scripts/products/product_detail.jsp?BV_. . . .
In the Know, Important Information About Your Account, Smith Barney Citigroup, 2005, 6 Sheets.
Letter From Joseph A. DiNuzzo, Counsel, Oct. 20, 1999, FDIC, Federal Deposit Insurance Corporation, 1 Sheet.
Letter From Roger A. Hood, Assistant General Counsel, Jul. 16, 1986, FDIC, Federal Deposit Insurance Corporation, Legal Division, 1 Sheet.
Merriam-Webster Online Dictionary, 10th Edition, Definition of "Associated", 2 Sheets.
Merrill Lynch Announces Beyond Banking, The Power of Advice for Smarter Cash Management, Jan. 8, 2 Sheets.
Merrill Moves CMA Cash to Bank, Street Talk, On Wall Street, Nov. 2000, p. 26.
Merrill Lynch & You, "Financial Services the Way You Want, When You Want Them," Jan. 2000 4 Sheets.
Merrill Lynch, Pierce, Fenner & Smith Incorporated, "Information Statement," 2000, 12 Sheets.
Money Fund Report, Bank of New York Adds Insured Sweeps Option, Friday, May 3, 2002, The Reserve Funds, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
O'Brian, "Money-Market Funds Suit Many Investors, But Proud Creator Frets About Extra Risk," Re-Printed From the Wall Street Journal, Monday, Nov. 6, 2000, Dow Jones & Company, Inc., 2 Sheets.
On Wall Street, Helping Brokers Build a More Successful Business, The Power of CASH, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwriting, From: Denise Russo, Director, Underwriting, 6 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Unmatched Sweep Solution From the Cash Management Expert, 2 Sheets.
Waddell, "Sweeping Clean," Advisor, The Advisor to Advisors, 2 Sheets.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, 1 pg.
Addendum to Insured Savings Agency Agreement, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 Civ. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.

Investors MoneyAccounts$^{SM}$ and Insurance Plus Service Agreement, Schedule A, 3 sheets.
Investors MoneyAccounts$^{SM}$ (an FDIC-insured money market account), 4 sheets.
Investors MoneyAccounts$^{SM}$ The FDIC-Insured Money Market with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 *FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review© A Publication of *Meyer Weekly Interest Rate Survey*, A Look At Tiers, vol. II, No. 4, Apr. 1987, 6 pgs.
Interest Rate Review© A Publication of *Meyer Weekly interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, 3 sheets.
Quest Insured Account, *Information Statement*, 5 sheets.
OCC Insured Bank Deposit Account, 3 sheets.
Insured Bank Deposit Account, *Information Statement*, Jul. 1, 2000, 2 sheets.
Letter from Marilyn J. Hensle, announcing Salomon Smith Barney Bank Deposit Program.$^{SM}$, with Q&A, 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.

Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by Island Intellectual Property LLC and IntraSweep LLC against Deutsche Bank Trust Company Americas and Total Bank Solutions, Complaint for Patent Infringement, Jury Trial Demanded, Feb. 23, 2010, Case No. 10 Cv 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for depoists.html, Jan. 15, 2010, 2 sheets. Banks, AmVest capital, www.amvestonline.com/federally-insured-deposits.html, Jan. 15, 2010, 2 sheets.
Flow Chart, AmVest Capital, www.amvestonline.com/flow-char.html, Dec. 9, 2009, 2 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, www.amvestonline.com/fparticipation-criteria.html, Jan. 15, 2010, 4 pgs.
Federally Insured Deposits/FAQ, Frequently Asked Questions on the Federally Insured Deposit Program, AmVest Capital, www.amvestonline.com/ffdic-faq.html Jan. 15, 2010, 2 sheets.
Federally Insured Deposit Program Forms & Links, AmVest Capital, www.amvestonline.com/froms-link.html, Jan. 15, 2010, 1 pgs.
Money Market Rates, www.clearviewcs.com/downloads/mmktrates/clearviewratesii.htm, Jan. 18, 2010, 2 sheets.
Money Market Rates, www.clearviewcs.com/downloads/mmktrates/clearviewratesii.htm Jan. 6, 2010, 3 pgs.
Money Market Rates, www.clearviewcs.com/downloads/mmktrates/clearviewratesii.htm, Nov. 12, 2009, 3 pgs.
Scott & Stringfellow starts correspondent clearing business, News Release BB&T, http://bbt.mediaroom.com/inddex.php?s=43&item=655, Nov. 13, 2007, 2 sheets.
Curian Capital Introduces Custom Wealth Platform, Market Watch, www.marketwatch.com/story/curian-capital-indroduces-custom-wealth-platform-2009-08-18, Aug. 18, 2009, 3 pgs.
Ellie Behling, Curian Capital Introduces Custom Wealth Platform, www.planadviser.com/curian_capital_introduces_custom_wealth_platform.aspx, Nov. 10, 2009, 3 sheets.
Curian Capital Introduces Custom Wealth Platform, Reuters, www.reuters.com/article/pressrelease/idUS157698+18, Aug. 18, 2009, 3 pgs.
Curian Capital Introduces Custom Wealth Platform, WSJ.com, http://online/wsj.com/article/pr-co20090818-904833.html, Aug. 18, 2009, 3 pgs.
Curian Capital, LLC: Private Company Information, Business Week, http://investing.businessweek.com/research/stocks/private/snapshot..asp?privatcapld, Nov. 10, 2009, 3 pgs.
Curian Capital Introduces Custom Wealth Platform, Yahoo! Finance, http://finance.vahoo.com/nes/curian-capital-introduces-bw-2647134643.htm, Aug. 18, 2009, 3 pgs.
Bank Insured Deposit Program, D.A. Davidson & Co., http://www.davisoncompanies.com/indv/a_services/92.cfm?linkid=92, Jan. 15, 2010, 2 sheets.
Bank Insured Deposit Program, D.A. Davidson & Co., http://www.davisoncompanies.com/indv/a_services/92.cfm?linkid=92, Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, www.folioinvesting.com/broeragefeatures/cash-investments.jsp Jan. 15, 2010, 2 sheets.
Folio Investing: Brokerage Features >> Cash Investments>> FDIC. PLUS Program, www.folioinvesting.com/broeraoefeatures/cash-investments.jsp, Jan. 14, 2010, 3 pgs.
Folio Investing: Brokerage Features >> Cash Investments>> Cash Seep Rates, www.folioinvestinq.com/broeraciefeatures/cash-investments.jspm, Jan. 14, 2010, 2 sheets.
Folio Investing: Brokerage Features >> Cash Investments>> Cash Seep Banks, www.folioinvesting.com/broeragefeatures/cash-investments.jsp, Jan. 15, 2010, 3 pgs.
Folio Investing: Brokerage Features >>Cash Investments>> Cash Sweep FAQ, www.folioinvesting.com/broeragefeatures/cash-investments.jsp, Jan. 14, 2010, 3 pgs.
Folio Investing: Brokerage Features>>Cash Investments>> Cash Sweep FAQ, www.folioinvesting.com/broeragefeatures/cash-investments.jsp, Jan. 18, 2010, 2 sheets.
Folio Investing: Brokerage Features >> Cash Investments Cash Sweep FAQ, www.folioinvesting.com/broeragefeatures/cash-investments.jsp, Jan. 15, 2010, 2 sheets.
Folio Investing: Brokerage Features >> Cash Investments>> Sweep Terms & Conditions, www.folioinvesting.com/broeragefeatures/cash-term-and-conditions.jsp, Jan. 14, 2010, 8 sheets.
H.C. Denision Company, Sheboygan, WI, www.hcdension.com/index.html, 1 sheet.
The LYRA Program with H.C. Denison Company, Sheboygan Wisconsin, Jan. 15, 2010, 2 sheets. www.hcdension.com/LYRA.html, Jan. 15, 2010, 2 sheets.
Current LYRA Program Rates, H.C. Denison sheet. Co., www.hcdension.com/rates.html, Jan. 15, 2010, 1 sheet.
Current LYRA Program Rates, H.C. Denison sheet. Co., www.hcdension.com/rates.html Nov. 2, 2009, 1 sheet.
Current LYRA Program Banks, H.C. Denison Co. LYRA Program, www.hcdension.com/banks.html, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., www.hcdension.com/FAQ.html, Jan. 15, 2010, 3 pgs.
Terms & Conditions for H.C. Denison Company's Liquidity Insured reserve Access Program (LYRA Program), www.hcdension.com/termas_conditions.html, Jan. 15, 2010, 4 pgs.
Terms & Conditions for H.C. Denison Company's Liquidity Insured reserve Access Program (LYRA Program), www.hcdension.com/termas_conditions.html, Nov. 2, 2009, 4 pgs.
Contact US/MAP LINK, H.C. Denison Co., www.hcdension.comContactsUS.html, Nov. 2, 2009, 1 sheet.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, www.optionsxpress.com/welcom/faq/aq/fdc.aspx-#rate. 1 sheet.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.

Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.
UPDATE New FDIC product at IPI: Deutsche Bank Insured Deposit Program, Investment Professionals Inc, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, 3 pgs.
Insured deposit program, www.aigadvisorgroup.com/fdic/03.04.09.htm, Jan. 15, 2010, 3 pgs.
FlexInsured Accounts$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Terms and conditions for cash sweep, sterne agee, 2 sheets.
Client account agreement to Sterne Agee Clearing, INC, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking needs covered!, Greater Franklin, 2009, 2 sheets.
Insured MMA Seep Program, Circle Bank, www.circlebank.com/personalbankinq)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/encilish/FDIC.asp, Nov. 10, 2009, 1 sheet.
Safe sound secure insured deposit programs, East West Bank, www.eastweatbank.com/English/S_SIDProqrams.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/ Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.

Total Bank Solutions, Insured Deposit Program, Bank Sweep Program, www.totalbanksolutions.com/insured-deposit.cfm Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage FREE Webiners, http://209.235.145/cgi-bin/websuite/tcsassnwebsuite.pl? . . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_gn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money Account$^{SM}$ System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
U.S. Appl. No. 09/677,535, filed Oct. 2, 2000, Bruce Bent et al.
U.S. Appl. No. 10/825,440, filed Apr. 14, 2004, Bruce Bent et al.
U.S. Appl. No. 11/641,046, filed Dec. 19, 2006, Bruce Bent et al.
U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/622,979, filed Nov. 20, 2009, Bruce Bent et al.
U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent II et al.
U.S. Appl. No. 12/829,961, filed Jul. 2, 2010, Bruce Bent et al.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Deutsche Bank Insured Deposit Program, Marketing Literature 2007, 3 pages.
Dreyfus Insured Deposit Program, Disclosure Statement and Terms and Conditions, Dreyfus A BNY Mellon Company, 8 Sheets.
Dreyfus Insured Deposit Program, Multiple List Program—Effective May 11, 2009, 1 Sheet.
Email from Olivia Kim to Charles Macedo on Jun. 9, 2010 with attachement of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Federal Register: Oct. 9, 1997 (vol. 62, No. 196), pp. 52809-52868. http://www.fdic.gov/news/news/inactivefinancial/1997/fil97111b.html.
Finistar Reg. No. 2,939,558, Registered Apr. 12, 2005.

Garmhausen, "Matching Small Banks with Large Muni Deposits," American Banker, Online the Financial Services Resource, Oct. 4, 2005, 4 pages, http://www.finstar.com/docs/AmericanBanker.html.
Hencke, "New Rules for FDIC deposit Insurance", ABA Bank Compliance, vol. 20, No. 7, Jul./Aug. 1999, pp. 31-37.
IDC Deposits, online, http://idcdeposits.com/, 2009, 1 Sheet.
Insured Bank Deposit Program Summary Information Statement, Information Statement, and list of Eligible Program Banks Effective Feb. 10, 2005, 11 pages.
Jong et al., "The Valuation and Hedging of Variable Rate Savings Accounts," University of Amsterdam, Nov. 15, 2001, 23 Sheets.
Lake Forest Bank & Trust Company, Introducing MaxSafe Deposit Accounts with up to $3.75 Million in FDIC Insurance, www.lakeforestbank.com/maxsafe, 2 Sheets.
Lawsuit by Carlo DeBlasio et al. against Merrill Lynch & Co., Inc. et al., Declaration of Andrew W. Stern, including Exhibits A, B, C, D, E and F, Nov. 11 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks", . . . .
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14 2007, Case No. 07-cv-318 (RJS) (Document 69).
Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14 2007, Case No. 07-318 (RJS) (Document 67).
Lawsuit by Carlo DeBlasio et al. against Merrill Lynch & Co., Inc. et al., Declaration of Scott D. Musoff in Support of the Merrill Lynch Defendants' Motion to Dismiss the Second Amended Class Action Complaint, ECF Case, Nov. 12 2007, Case No. 07-cv-318 (RJS) (Document 64).
Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.
Lawsuit by Carlo DeBlasio et al. against Merrill Lynch & Co., Inc. et al., Supplemental Declaration of Matthew J. Terry in Support of Motion to Dismiss by Defendant Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding Motions, Jul. 27, 2009, Case No. 07 CIV 318(RJS).
Lawsuit by Island Intellectual Property LLC and lntrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and lntrasweep LLC against Institutional Deposits Corp., Complaint for Patent Infringement, Jury Trial Demanded, Nov. 4, 2009, Civil Action No. 09 CV 3079.
Lawsuit by Island Intellectual Property LLC and Intrasweep LLC against Institutional Deposits Corp., Consent Order, Apr. 21, 2010, Case No. 09-CV-3079 (Document 44).
Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.
Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).
Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 Civ 2675 (VM) (AJP), (Document 86).
Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 Civ 2675 (VM) (AJP) (Document 87).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11 2009, Civil Action No. 09 Civ 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.

Lawsuit by Island Intellectual Property LLC, Lids Capital LLC, Double Rock Corporation and Intrasweep LLC against Promontory Inter-financial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 Cv 2675 (VM) (AJP) (Document 73).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 Civ 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Mbsc Securities Corporation's Counterclaims, Jul. 9, 2009, Civil Action No. 09 Civ 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.

Letter from Roger M. Zaitzeff, Seward & Kissel to Gilbert T. Schwartz, Associate General Counsel, Board of Governors of the Federal Reserve System; May 10, 1983, 5 sheets.

Letter to William R. Burdette, CEO, Apr. 6, 2009, FDIC, Federal Deposit Insurance Corporation, 2 pages.

Letter to William R. Burdette, CEO, Nov. 15, 2007, FDIC, Federal Deposit Insurance Corporation, 5 Sheets.

Northbrook Bank & Trust Company, Introducing our MaxSafe CD with up to $700,000 of FDIC Insurance, 4 Sheets.

Northbrook Bank & Trust Company, Seven Times the Security of a Normal CD, Introducing our MaxSafe CD, 4 Sheets.

Promontory Interfinancial Network, Promontory Interfinancial Network Announces New Deposit Placement Service, Jan. 21, 2003, 3 Sheets.

Promontory Interfinancial Network: Frequently Asked Questions (FAQs), Feb. 5, 2003, 5 pages.

RING, National/Global, "Amex Spans the Globe in Retail Bank Buildup," Nov. 27, 2000, 1 Sheet.

The Pershing Press, Dreyfus Insured Deposit Program, Issue 2, Aug. 2008, http://www.pershing.com/news/pershing_press/news_466244.html, 2 Sheets.

The Reserve Funds, Objectives, Observations & Strategies for American Enterprises Inv., Oct. 18, 2000, 11 Sheets.

Total Bank Solutions, Bank Sweep FAQs http://www.totalbanksolutions.com/sweepbnkfaqs.htm, Sep. 23, 2005, 2 pages.

Total Bank Solutions, Bank Sweep FAQs, http://www.totalbanksolutions.com/sweepbnkfaqs.htm, Nov. 2, 2005, 3 pages.

Total Bank Solutions, Bank Sweep Products, Deutsche Bank, http://www.totalbanksolutions.com/banksweep.htm, Sep. 23, 2005, 1 page.

Total Bank Solutions, Bank Sweep Products, http://www.totalbanksolutions.com/banksweep.htm, Appendix 3, Oct. 18, 2005, 2 pages.

Total Bank Solutions, Bank Sweep Products, http://www.totalbanksolutions.com/banksweep.htm, Nov. 2, 2005, 2 pages.

Total Bank Solutions, Brokerage Sweep FAQs, http://www.totalbanksolutions.com/brokerfaqs.htm, Nov. 2, 2005, 3 pages.

Total Bank Solutions, Brokerage Sweep, http://www.totalbanksolutions.com/brokersweep.htm, Nov. 2, 2005, 1 page.

Total Bank Solutions, Deposit Bank FAQs, http://www.totalbanksolutions.com/depositbnkfaqs.htm, Nov. 2, 2005, 2 pages.

Total Bank Solutions, Deposits, Deutsche Bank, http://www.totalbanksolutions.com/deposits.htm, Sep. 23, 2005, 1 page.

Total Bank Solutions, Deposits, http://www.totalbanksolutions.com/deposits.htm, Nov. 2, 2005, 2 pages.

Total Bank Solutions, Deutsche Bank Insured Deposit Program, DB Insured Deposit Program Features, http://www.totalbanksolutions.com/features.htm, Sep. 23, 2005, 2 pages.

Total Bank Solutions, Deutsche Bank Insured Deposit Program, http://www.totalbanksolutions.com/, Sep. 23, 2005, 1 page.

Total Bank Solutions, http://www.totalbanksolutions.com/, Mar. 16, 2007, 8 pages.

Total Bank Solutions, http://www.totalbanksolutions.com/overview.htm, Nov. 2, 2005, 1 page.

Total Bank Solutions, Insured Deposit Program Features, http://www.totalbanksolutions.com/features.htm, Nov. 2, 2005, 2 pages.

Total Bank Solutions, Insured Deposit Program, http://www.totalbanksolutions.com/Insureddeposits.htm, Nov. 2, 2005, 2 pages.

Total Bank Solutions, Partners & Affiliates, http://www.totalbanksolutions.com/partners.htm, Nov. 2, 2005, 3 pages.

Total Bank Solutions, Partners & Affiliates, http://www.totalbanksolutions.com/partners.htm, Oct. 25, 2005, 3 pages.

Total Bank Solutions, Strategtic Partners, Nov. 2, 2005, 1 page.

Total Bank Solutions, TBS Deposit Account, About Our Broker Products, http://www.totalbanksolutions.com/brokerproducts.htm, Sep. 7, 2005, 2 pages.

Total Bank Solutions, TBS Management Team, http://www.totalbanksolutions.com/management.htm, Appendix 1, Oct. 18, 2005, 1 page.

Total Bank Solutions, TBS Management Team, http://www.totalbanksolutions.com/management.htm, Nov. 2, 2005, 2 pages.

Total Bank Solutions, TBS Management Team, http://www.totalbanksolutions.com/management.htm, Oct. 25, 2005, 2 pages.

TotalBank Solutions, TBS Bank Deposit Account, Oct. 2004, 6 pgs.

TotalBank Solutions, web.archive.org/web/20050126044216/http://totalbanksolutions.com, Jan. 26, 2005, 2 pgs.

USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Investors MoneyAccount$^{SM}$ and Insurance Plus Service Agreement, attached Schedule A (List of Banks Participating in the Insurance Plus Service), IMAD Mar. 1994, 3 pages. •.
First National Bank in Brookings, Certificates of Deposit [online] [retrieved on Jul. 17, 2009]. Retrieve1d from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Letter to Client, from M.J. Hensle, Re: Salomon Smith Barney Bank Deposit Programs$^{SM}$, (attached Q&A: Important Information about the New Salomon Smith Barney Bank Deposit Program), Aug. 16, 2020, 14 pages.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
Federal Reserve System, Lexsee 56 FR 15494, "Regulation D--Reserve Requirements of Depository Institutions," Action: Final Rule, Apr. 17, 1991, 5 pages.
Letter to R.M. Zaitzeff, from W.W. Wiles, dated Jun. 22, 1983 (response to May 10, 1983 letter re: offering of MMDA5), 6 pages.
Product Strategy, "Money Fund $$ Moving to Bank Deposits, Distributors Start to Install Bank Deposit Accounts to Replace Money, Funds," 6 FRC Monitor, Dec. 2003, 2 pages.
USPTO Office Action, Interview Summary, U.S. Appl. No. 11,767,827, Date Mailed Sep. 23, 2009, 4 pages.
OCC Insured Bank Deposit Account (attached are p. 2 of Quest for Value Funds Daily Data, Jun., 1993; OCC Insured Account Rate Table), 3 pages.
Letter to Client, from M.J. Hensle, Re: Salomon Smith Barney Bank Deposit Programs$^{SM}$, (attached Q&A: Important Information about the New Salomon Smith Barney Bank Deposit Program), Aug. 16, 2002, 14 pages.
FDIC, FDIC Law, Regulations, Related Acts—4000—Advisory Opinions, Jun. 28, 1993, J. A. DiNuzzo, (online) [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/lawskules/4000-2120.html#fdic400086-21>, 2 pages.
LexisNexis, The American Banker, Sep. 23, 1983, Merrill Joins Money Market Account, CMA; Broker Begins Testing With 12 Institutions, Byline: A. Arvan, 4 pages.
Federal Reserve System, LEXSEE 56 FR 15494, "Regulation D—Reserve Requirements of Depository Institutions," Action: Final Rule, Apr. 17, 1991, 5 pages.
Merrill Lynch, The Merrill Lynch Capital Builder$^{SM}$ Account Financial Service, Insured Savings$^{SM}$ Account Participating Depository Institutions, 1996, 2 pages.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by *Island Intellectual Property LLC v. Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC v. Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC v. Clearview Correspondent Services, LLC*, et al.; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC v. First Southwest Company*; First Southwest Company's Answer to Complaint and Counterclaims; Civil Action 1:11-cv-371-SD; Jun. 20, 2011; 11 pages.
*Island Intellectual Property LLC et al. v. Deutsche Bank AG, et al.*; Memorandum and Order; Case 1:09-cv-02675-KBF; Doc. 289; Feb. 14, 2012; pp. 1-28.
*Island Intellectual Property LLC et al; v. Deutsche Bank AG, et al.*; Order; Case 1:09-cv-02675-KBF; Doc. 221; Feb. 14, 2012; pp. 1-34.
*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF: Doc. 260; Feb. 3, 2012; pp. 1-3 and Exhibits.
*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1.09-cv-02675-KBF; Doc. 269; Feb. 6, 2012; pp. 1-18.
*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284. Feb. 10, 2012; pp. 1-12.
*Island Intellectual Property LLC et al. v. Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al. v. Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al. v. Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al. v. Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
*Lawsuit by Island Intellectual Property LLC et al. v. Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
Scottrade Bank Deposit Program—Terms, Conditions & Disclosures; Author unknown; 8-11; pp. 1-3.

SYSTEMS, METHODS AND PROGRAM PRODUCTS FOR SWAP PROCESSING FOR UNINSURED ACCOUNTS

RELATED APPLICATION

This application claims priority to and hereby incorporates into this application all of the subject matter of provisional application 61/025,553, filed on Feb. 1, 2008, provisional application 60/895,320, filed on Mar. 16, 2007, and provisional application 60/892,107, filed on Feb. 28, 2007, in their entirety as if fully set forth herein.

SUMMARY

In one embodiment, a method is described for enhancing safety for funds in aggregated accounts, comprising: determining which clients associated with at least one financial entity are eligible clients, wherein the eligible client comprises a client with an account balance associated with the at least one financial entity below a first predetermined amount; allocating electronically account balances of funds of a plurality of client accounts of a plurality of the clients associated with the at least one financial entity among a plurality of insured interest-bearing aggregated accounts, each different aggregated account held in a different one of a plurality of program banks, wherein the allocating step allocates accounts of the eligible clients among each of a plurality of the banks; maintaining or having maintained an electronic database recording balances associated with the plurality of the clients of the at least one financial entity in the aggregated accounts in the respective different program banks; determining electronically after the allocating step a respective excess amount by which a balance of funds of any of the respective clients in one of the program banks exceeds a second predetermined amount so that at least a portion of this excess amount over the second predetermined amount is uninsured in the one program bank, wherein if one of the clients has been determined to have an amount of funds that exceeds the second predetermined amount in the one program bank, that client is referred to as an excess client and the one program bank is referred to as an excess bank; selecting one of the eligible clients with funds in a different one of the program banks for an electronic swap of funds with the excess client in the excess bank; and swapping electronically in the electronic database a third amount associated with the selected eligible client in the aggregated account in the different program bank that holds funds of the selected eligible client with an amount equal to the third amount associated with the one excess client in the excess bank.

In a further embodiment, the selecting step selects an eligible account with an account balance in the excess bank of less then a fourth predetermined amount.

In a yet further embodiment, the selecting of the eligible client is based, in part, on whether the account balance of the eligible client in the different program bank is greater than a predetermined amount.

In a yet further embodiment, the step of allocating electronically account balances of funds of a plurality of client accounts includes allocating accounts of the eligible clients among each of a plurality of the banks is a first allocation of the day.

In a yet further embodiment, the excess bank is a holdback program bank.

In a yet further embodiment, the allocating balances of eligible clients step does not allocate eligible client balances to a holdback program bank.

In a yet further embodiment, the steps are disclosed of selecting at least one additional eligible client for an electronic swap; and wherein the swapping step comprises swapping a fifth amount that is a composite of the third amount associated with the one eligible client and an additional amount associated with the at least one additional eligible client with an amount equal to the fifth amount associated with the one excess client.

In a yet further embodiment, the eligible client is selected based at least on a criterion of maintaining insurance coverage for the amount to be swapped in both the different program bank and the excess bank.

In a yet further embodiment, the selecting of the eligible client with funds in the different program bank is based, in part, on whether the one excess client has funds in the different program bank holding funds of the eligible client.

In a yet further embodiment, the selecting of the eligible client is based, in part, on minimizing a number of swaps required to insure the entire excess amount of the excess client.

In a yet further embodiment, the swapping step comprises allocating electronically in the electronic database to the excess bank the third amount of funds of the one eligible client from the aggregated account in the different program bank that holds funds of the one eligible client and associating this third amount in the excess bank to the one eligible client; and reallocating electronically in the electronic database from the excess bank an amount equal to the third amount associated with the one excess client to the aggregated account in the different program bank, and associating to the excess client this third amount in the aggregated account in the different program bank, to thereby reduce the funds held in the excess bank associated with the one excess client.

In a yet further embodiment, the steps are disclosed of repeatedly selecting a different eligible client and performing the swapping step in an iterative process until an entire uninsured amount associated with the one excess client in the excess bank has been reallocated to one or more of the program banks.

In a yet further embodiment, the allocating step distributes account balances of the eligible clients among a plurality of the program banks based on a criterion of maximizing the amount of excess funds of a plurality of excess clients in the excess bank that can be swapped among a plurality of the banks while still complying with at least one of an eligible client opt-out instruction for one or more of the banks and respective maximum deposit caps associated with the respective program banks.

In a yet further embodiment, the accounts of eligible clients are distributed substantially equally across all of the plurality of program banks except at least a holdback bank.

In a yet further embodiment, a plurality of excess clients are determined, and further comprising selecting an order of excess clients for performing the swapping step based on a prioritization of the excess clients.

In a yet further embodiment, the allocating step is referred to as a first allocating step, and further comprising: making electronically at a time after the first allocating step a second allocating of account balances of funds of a plurality of the client accounts of a plurality of the clients associated with the at least one financial entity among a plurality of the insured interest-bearing aggregated accounts in the different respective program banks, in order to administer later deposits and withdrawals made after the allocating step, and after a respective amount for a balance of funds in the respective aggregated account has been fixed for a remainder of a period, for each of a plurality of the respective program banks.

In a yet further embodiment, a step is disclosed of swapping an equal amount of funds electronically between an excess bank and a safety bank.

In a yet further embodiment, a step is disclosed of reallocating so that an amount associated with the excess client in the different program bank after the swapping step does not exceed the second predetermined amount.

In a yet further embodiment, a step is disclosed of resetting a minimum cap or a maximum cap for at least one of the program banks in a following period after the swapping step.

In a yet further embodiment, a step is disclosed of creating an audit trail of allocations and reallocations of client funds at each of the program banks and the excess bank.

In a yet further embodiment, a step is disclosed of electronically generating and electronically communicating an on-the-fly report of uninsured funds.

In a yet further embodiment, a step is disclosed of adjusting previously set maximum deposit caps on one or more of the program banks based on information related to a prediction of after-cutoff time deposits by clients of the one or more financial entities.

In a further embodiment, a method is disclosed for enhancing safety for funds in aggregated accounts, comprising: determining which clients associated with at least one financial entity are eligible clients, wherein the eligible client comprises a client with an account balance associated with the at least one financial entity below a first predetermined amount; allocating electronically account balances of funds of a plurality of client accounts of a plurality of the clients associated with the at least one financial entity among a plurality of insured interest-bearing aggregated accounts, each different aggregated account held in a different one of a plurality of program banks, wherein the allocating step allocates accounts of the eligible clients among each of a plurality of the banks; maintaining or having maintained an electronic database recording balances associated with the plurality of the clients of the at least one financial entity in the aggregated accounts in the respective different program banks; determining electronically after the allocating step a respective excess amount by which a balance of funds of any of the respective clients in one of the program banks exceeds a second predetermined amount so that at least a portion of this excess amount over the second predetermined amount is uninsured in the one program bank, wherein if one of the clients has been determined to have an amount of funds that exceeds the second predetermined amount in the one program bank, that client is referred to as an excess client and the one program bank is referred to as an excess bank; selecting one of the eligible clients with funds in a different one of the program banks for an electronic swap of an amount of funds with the excess client in the excess bank; and swapping electronically in the electronic database a third amount associated with the selected eligible client in the aggregated account in the different program bank that holds funds of the selected eligible client with an amount equal to the third amount associated with the one excess client in the excess bank, wherein the step of allocating electronically account balances of funds of the eligible clients among each of a plurality of the banks is performed after a step of allocating a respective amount to each of a plurality of the respective program banks, which respective amount is fixed for the remainder of the day for its respective program bank.

In a further embodiment, a method is disclosed for enhancing safety for funds in aggregated accounts, comprising: allocating electronically account balances of funds of a plurality of client accounts of a plurality of the clients associated with the at least one financial entity among a plurality of insured interest-bearing aggregated accounts, each different aggregated account held in a different one of a plurality of program banks; maintaining or having maintained an electronic database recording balances associated with the plurality of the clients of the at least one financial entity in the aggregated accounts in the respective different program banks; determining electronically after the allocating step a respective excess amount by which a balance of funds of any of the respective clients in one of the program banks exceeds a first given amount so that at least a portion of this excess amount over the first given amount is uninsured in the one program bank, wherein if one of the clients has been determined to have an amount of funds that exceeds the first given amount in the one program bank, that client is referred to as an excess client and the one program bank is referred to as an excess bank; selecting a high account balance of a high balance client associated with the at least one financial entity that is above the first given amount and that is held in a plurality of the aggregated accounts in a plurality of the program banks; and swapping electronically in the electronic database a second amount associated with the high balance client from one of the program banks that holds funds of the selected high balance client to the excess bank and an amount equal to the second amount associated with the one excess client in the excess bank to the aggregated account in the one program bank that holds funds of the selected high balance client.

In a further embodiment, a system is disclosed for enhancing safety for funds in aggregated accounts, comprising: at least one computer operably connected to the storage medium, and including the following components therein or among them if more than one: a component for determining which clients associated with at least one financial entity are eligible clients, wherein the eligible client comprises a client with an account balance associated with the at least one financial entity below a first predetermined amount; a component for allocating electronically account balances of funds of a plurality of client accounts of a plurality of the clients associated with the at least one financial entity among a plurality of insured interest-bearing aggregated accounts, each different aggregated account held in a different one of a plurality of program banks, wherein the allocating step allocates accounts of the eligible clients among each of a plurality of the banks; a component for communicating with an electronic database in a storage medium for recording balances associated with the plurality of the clients of the at least one financial entity in the aggregated accounts in the respective different program banks; a component for determining electronically after the component for allocating performs its allocating step a respective excess amount by which a balance of funds of any of the respective clients in one of the program banks exceeds a second predetermined amount so that at least a portion of this excess amount over the second predetermined amount is uninsured in the one program bank, wherein if one of the clients has been determined to have an amount of funds that exceeds the second predetermined amount in the one program bank, that client is referred to as an excess client and the one program bank is referred to as an excess bank; a component for selecting one of the eligible clients with funds in a different one of the program banks for an electronic swap of an amount of funds with the excess client in the excess bank; and a component for swapping electronically in the electronic database a third amount associated with the selected eligible client in the aggregated account in the different program bank that holds funds of the selected eligible client with an amount equal to the third amount associated with the one excess client in the excess bank.

In a further embodiment, a program product is described for enhancing safety for funds in aggregated accounts, comprising: one or more computer usable media having computer readable program code embodied therein or among them, to be executed by a computer, the computer readable program code comprising: program code for determining which clients associated with at least one financial entity are eligible clients, wherein the eligible client comprises a client with an account balance associated with the at least one financial entity below a first predetermined amount; program code for allocating electronically account balances of funds of a plurality of client accounts of a plurality of the clients associated with the at least one financial entity among a plurality of insured interest-bearing aggregated accounts, each different aggregated account held in a different one of a plurality of program banks, wherein the allocating step allocates accounts of the eligible clients among each of a plurality of the banks; program code for maintaining or having maintained an electronic database recording balances associated with the plurality of the clients of the at least one financial entity in the aggregated accounts in the respective different program banks; program code for determining electronically after the allocating step a respective excess amount by which a balance of funds of any of the respective clients in one of the program banks exceeds a second predetermined amount so that at least a portion of this excess amount over the second predetermined amount is uninsured in the one program bank, wherein if one of the clients has been determined to have an amount of funds that exceeds the second predetermined amount in the one program bank, that client is referred to as an excess client and the one program bank is referred to as an excess bank; program code for selecting one of the eligible clients with funds in a different one of the program banks for an electronic swap of an amount of funds with the excess client in the excess bank; and program code for swapping electronically in the electronic database a third amount associated with the selected eligible client in the aggregated account in the different program bank that holds funds of the selected eligible client with an amount equal to the third amount associated with the one excess client in the excess bank.

In a further embodiment, a program product is disclosed for enhancing safety for funds in aggregated accounts, comprising: one or more computer usable media having computer readable program code embodied therein or among them, to be executed by a computer, the computer readable program code comprising: program code for determining which clients associated with at least one financial entity are eligible clients, wherein the eligible client comprises a client with an account balance associated with the at least one financial entity below a first predetermined amount; program code for allocating electronically account balances of funds of a plurality of client accounts of a plurality of the clients associated with the at least one financial entity among a plurality of insured interest-bearing aggregated accounts, each different aggregated account held in a different one of a plurality of program banks, wherein the allocating step allocates accounts of the eligible clients among each of a plurality of the banks; program code for maintaining or having maintained an electronic database recording balances associated with the plurality of the clients of the at least one financial entity in the aggregated accounts in the respective different program banks; program code for determining electronically after the allocating step a respective excess amount by which a balance of funds of any of the respective clients in one of the program banks exceeds a second predetermined amount so that at least a portion of this excess amount over the second predetermined amount is uninsured in the one program bank, wherein if one of the clients has been determined to have an amount of funds that exceeds the second predetermined amount in the one program bank, that client is referred to as an excess client and the one program bank is referred to as an excess bank; program code for selecting one of the eligible clients with funds in a different one of the program banks for an electronic swap of an amount of funds with the excess client in the excess bank; and program code for swapping electronically in the electronic database a third amount associated with the selected eligible client in the aggregated account in the different program bank that holds funds of the selected eligible client with an amount equal to the third amount associated with the one excess client in the excess bank, wherein the step of allocating electronically account balances of funds of the eligible clients among each of a plurality of the banks is performed after a step of allocating a respective amount to each of a plurality of the respective program banks, which respective amount is fixed for the remainder of the day for its respective program bank.

In a further embodiment, a program product is disclosed for enhancing safety for funds in aggregated accounts, comprising: one or more computer usable media having computer readable program code embodied therein or among them, to be executed by a computer, the computer readable program code comprising: program code for allocating electronically account balances of funds of a plurality of client accounts of a plurality of the clients associated with the at least one financial entity among a plurality of insured interest-bearing aggregated accounts, each different aggregated account held in a different one of a plurality of program banks; program code for maintaining or having maintained an electronic database recording balances associated with the plurality of the clients of the at least one financial entity in the aggregated accounts in the respective different program banks; program code for determining electronically after the allocating step a respective excess amount by which a balance of funds of any of the respective clients in one of the program banks exceeds a first given amount so that at least a portion of this excess amount over the first given amount is uninsured in the one program bank, wherein if one of the clients has been determined to have an amount of funds that exceeds the first given amount in the one program bank, that client is referred to as an excess client and the one program bank is referred to as an excess bank; program code for selecting a high account balance of a high balance client associated with the at least one financial entity that is above the first given amount and that is held in a plurality of the aggregated accounts in a plurality of the program banks; and program code for swapping electronically in the electronic database a second amount associated with the high balance client from one of the program banks that holds funds of the selected high balance client to the excess bank and an amount equal to the second amount associated with the one excess client in the excess bank to the aggregated account in the one program bank that holds funds of the selected high balance client.

In a further embodiment, a system is disclosed for enhancing safety for funds in aggregated accounts, comprising: at least one computer operably connected to the storage medium, and including the following components therein or among them if more than one: a component for allocating electronically account balances of funds of a plurality of client accounts of a plurality of the clients associated with the at least one financial entity among a plurality of insured interest-bearing aggregated accounts, each different aggregated account held in a different one of a plurality of program banks; a component for communicating with an electronic database for recording balances associated with the plurality of the clients of the at least one financial entity in the aggregated accounts in the respective different program banks; a component for determining electronically after the allocating step a respective excess amount by which a balance of funds of any of the respective clients in one of the program banks exceeds a first given amount so that at least a portion of this excess amount over the first given amount is uninsured in the one program bank, wherein if one of the clients has been determined to have an amount of funds that exceeds the first given amount in the one program bank, that client is referred to as an excess client and the one program bank is referred to as an excess bank; a component for selecting a high account balance of a high balance client associated with the at least one financial entity that is above the first given amount and that is held in a plurality of the aggregated accounts in a plurality of the program banks; and a component for swapping electronically in the electronic database a second amount associated with the high balance client from one of the program banks that holds funds of the selected high balance client to the excess bank and an amount equal to the second amount associated with the one excess client in the excess bank to the aggregated account in the one program bank that holds funds of the selected high balance client.

In a further embodiment, a method is disclosed for enhancing safety for funds in aggregated accounts, comprising: allocating electronically account balances of funds of a plurality of client accounts of a plurality of the clients in a program of at least one financial entity among a plurality of insured interest-bearing aggregated accounts, each different aggregated account held in a different one of a plurality of program banks; maintaining or having maintained an electronic database recording balances associated with the plurality of clients of the at least one financial entity in the aggregated accounts in the respective different program banks; determining electronically after this allocating step one or more client accounts that have at least a portion of the funds therein within a program insurance limit that are uninsured; selecting one from the group of steps of determining which of those client accounts had no deposit activity for a current period and determining whether an amount of funds that are un-insured exceeds the client deposit activity for that client account; and swapping an amount from one of the program banks containing at least a portion of the un-insured funds of one of the client accounts with no deposit activity for the current period or with an amount of funds that are un-insured that exceeds the client deposit activity for that client account, with insured funds of another client in a different program bank to thereby insure at least a portion of these un-insured funds.

In a yet further embodiment, a step is disclosed of selecting to use the funds of the other client in the different program bank for a swap based at least on part on whether that other client had deposit activity during the current period.

In a yet further embodiment, a step is disclosed of selecting to use the funds of the other client in the different program bank for a swap based at least on part on whether that other client had deposit activity during the current period and on which sweep that deposit activity occurred.

In a yet further embodiment, a step is disclosed of selecting the other client in the different program bank based, in part, on whether the one client account with the uninsured funds includes funds in the different program bank.

In a further embodiment, a system is disclosed for enhancing safety for funds in aggregated accounts, comprising: at least one computer operably connected to the storage medium, and including the following components therein or among them if more than one: a component for allocating electronically account balances of funds of a plurality of client accounts of a plurality of the clients in a program of at least one financial entity among a plurality of insured interest-bearing aggregated accounts, each different aggregated account held in a different one of a plurality of program banks; a component for communicating with an electronic database for recording balances associated with the plurality of clients of the at least one financial entity in the aggregated accounts in the respective different program banks; a component for determining electronically after this allocating operation one or more client accounts that have at least a portion of the funds therein within a program insurance limit that are uninsured; a component for selecting one from the group of steps of determining which of those client accounts had no deposit activity for a current period and determining whether an amount of funds that are un-insured exceeds the client deposit activity for that client account; and a component for swapping an amount from one of the program banks containing at least a portion of the un-insured funds of one of the client accounts with no deposit activity for the current period or with an amount of funds that are un-insured that exceeds the client deposit activity for that client account, with insured funds of another client in a different program bank to thereby insure at least a portion of these un-insured funds.

In a further embodiment, a program product is disclosed for enhancing safety for funds in aggregated accounts, comprising: one or more computer usable media having computer readable program code embodied therein or among them, to be executed by a computer, the computer readable program code comprising: program code for allocating electronically account balances of funds of a plurality of client accounts of a plurality of the clients in a program of at least one financial entity among a plurality of insured interest-bearing aggregated accounts, each different aggregated account held in a different one of a plurality of program banks; program code for maintaining or having maintained an electronic database recording balances associated with the plurality of clients of the at least one financial entity in the aggregated accounts in the respective different program banks; program code for determining electronically after this allocating step one or more client accounts that have at least a portion of the funds therein within a program insurance limit that are uninsured; program code for selecting one from the group of steps of determining which of those client accounts had no deposit activity for a current period and determining whether an amount of funds that are un-insured exceeds the client deposit activity for that client account; and program code for swapping an amount from one of the program banks containing at least a portion of the un-insured funds of one of the client accounts with no deposit activity for the current period or with an amount of funds that are un-insured that exceeds the client deposit activity for that client account, with insured funds of another client in a different program bank to thereby insure at least a portion of these un-insured funds.

In a further embodiment, a method is disclosed for enhancing safety for funds in aggregated accounts, comprising: allocating a respective balance of funds to each of a plurality of program banks; allocating electronically account balances of funds of a plurality of client accounts of a plurality of the clients in a program of at least one financial entity among a plurality of insured interest-bearing aggregated accounts, each different aggregated account held in a different one of the plurality of program banks, wherein a respective total amount of funds allocated to each of the respective program banks equals the respective balance allocated to the respective program bank; maintaining or having maintained an electronic database recording balances associated with the plurality of clients of the at least one financial entity in the aggregated accounts in the respective different program banks; determining electronically after this allocating step those client accounts with at least a portion of the funds therein within a program insurance limit of the program that are uninsured; and swapping an amount from one of the program banks containing at least a portion of the un-insured funds of one of the client accounts with insured funds of another client in a different program bank to thereby insure at least a portion of these un-insured funds.

In a further embodiment, a system is disclosed for enhancing safety for funds in aggregated accounts, comprising: at least one computer operably connected to the storage medium, and including the following components therein or among them if more than one: a component for allocating a respective balance of funds to each of a plurality of program banks; a component for allocating electronically account balances of funds of a plurality of client accounts of a plurality of the clients in a program of at least one financial entity among a plurality of insured interest-bearing aggregated accounts, each different aggregated account held in a different one of the plurality of program banks, wherein a respective total amount of funds allocated to each of the respective program banks equals the respective balance allocated to the respective program bank; a component for communicating with an electronic database for recording balances associated with the plurality of clients of the at least one financial entity in the aggregated accounts in the respective different program banks; a component for determining electronically after this allocating step those client accounts with at least a portion of the funds therein within a program insurance limit of the program that are uninsured; and a component for swapping an amount from one of the program banks containing at least a portion of the un-insured funds of one of the client accounts with insured funds of another client in a different program bank to thereby insure at least a portion of these un-insured funds.

In a further embodiment, a program product is disclosed for enhancing safety for funds in aggregated accounts, comprising: one or more computer usable media having computer readable program code embodied therein or among them, to be executed by a computer, the computer readable program code comprising: program code for allocating a respective balance of funds to each of a plurality of program banks; program code for allocating electronically account balances of funds of a plurality of client accounts of a plurality of the clients in a program of at least one financial entity among a plurality of insured interest-bearing aggregated accounts, each different aggregated account held in a different one of the plurality of program banks, wherein a respective total amount of funds allocated to each of the respective program banks equals the respective balance allocated to the respective program bank; program code for maintaining or having maintained an electronic database recording balances associated with the plurality of clients of the at least one financial entity in the aggregated accounts in the respective different program banks; program code for determining electronically after this allocating step those client accounts with at least a portion of the funds therein within a program insurance limit of the program that are uninsured; and program code for swapping an amount from one of the program banks containing at least a portion of the un-insured funds of one of the client accounts with insured funds of another client in a different program bank to thereby insure at least a portion of these un-insured funds.

DETAILED DESCRIPTION OF PREFERRED EMBODIMENTS

Figure 1:
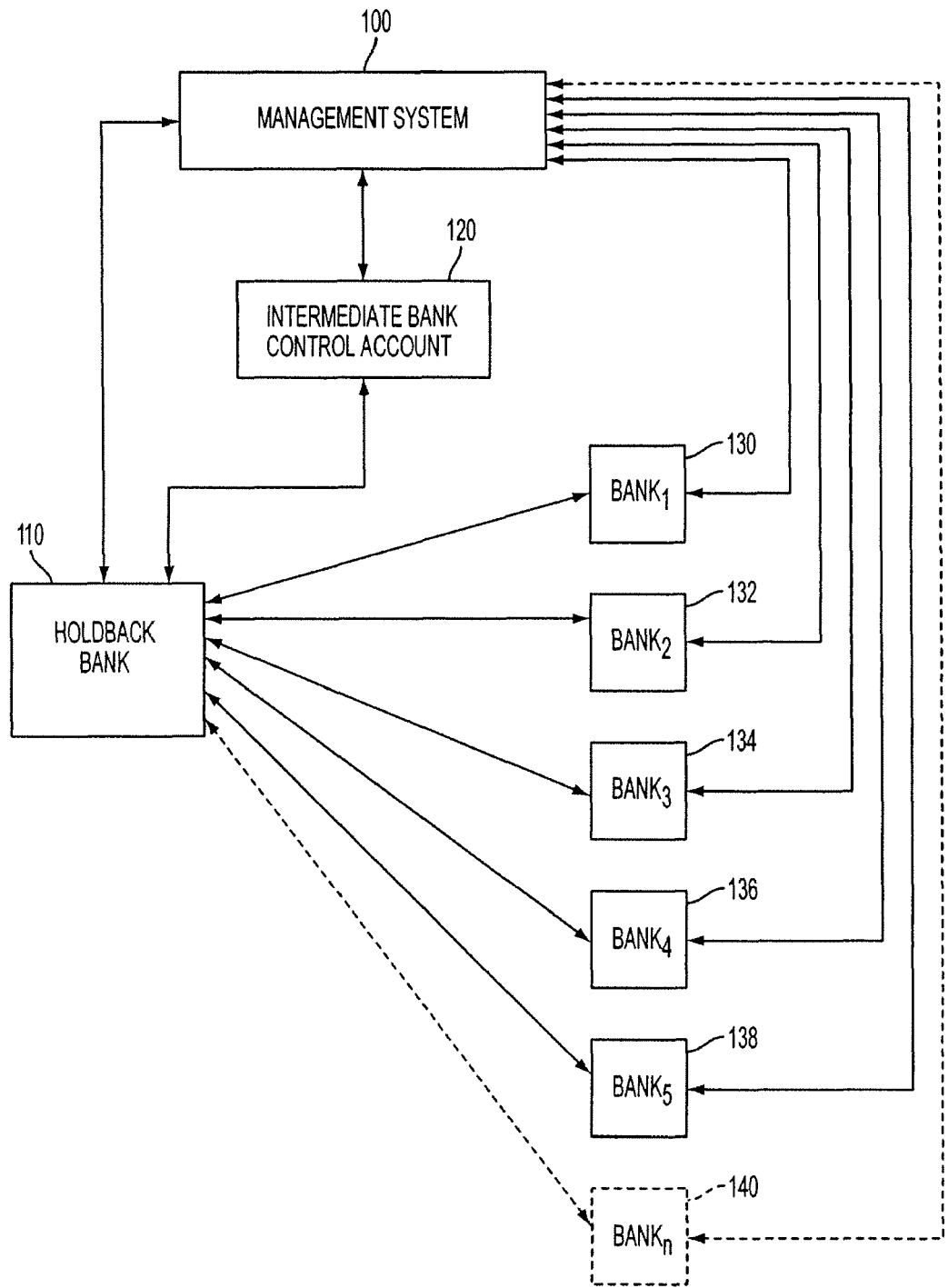
FIG. 1 is schematic block diagram of one embodiment.

The following terms used in this application are intended to have the meaning as described herein:

"aggregated account" comprises an account at a bank for holding funds for a plurality of clients from one or more financial entities. The aggregated account can be a segregated account that only holds the funds for a plurality of clients of a single financial entity that may be self-clearing. Alternatively, the aggregated account can hold the assets for a plurality of clients of a plurality of financial entities which may utilize the clearing services provided by a self-clearing financial entity or a management institution, depending upon the program.

"financial entity" is intended to be interpreted broadly to cover a variety of entities offering programs such as brokerage advisors, investment advisors, broker dealers, savings institutions, credit unions, banks, management institutions and the like. A financial entity may maintain one or more client accounts on behalf of one or more clients for receiving funds deposited thereto, and for debiting checks or other financial instruments drawn against that account.

"holdback bank" is a bank that has agreed to a temporary withdrawal of funds from its account which may be later used to settle late day client service and fee transactions, for example, cards/checks/ACH/fees, to name a few, that may be available for processing after the daily bank settlement deadline, typically 4:00 pm. The holdback withdrawal may be factored into the first runs and/or later runs of the bank allocation process on the sweep files, i.e., subtracted from credits to reduce the deposits to be allocated or added to debits to increase the dollar amount withdrawn from the holdback bank.

"safety bank" is a generally one of the larger banks in the Program that is less likely to experience bank failure. In simple terms it is considered a 'safe' bank to deposit the excess account balances. In one embodiment, the safety bank may be selected at the broker level. The program uses the safety bank selected under the broker level instructions and if that bank is opted out, then the bank with the highest capacity is used. Alternatively, due to opt-out instructions and other rules, there may be multiple safety banks, with the safety bank for a given client designated by rule.

"swapping" funds means changing the association of an amount of funds in an aggregated account in a first program bank from a first client to a second client, and changing an equal amount of funds in an aggregated account in a second program bank from the second client to the first client. Swapping does not require a physical transfer of funds from one bank to another.

"program" is a deposit arrangement to obtain FDIC insurance for account balances over the FDIC insurance limit through the use of a plurality of aggregated accounts, with each aggregated account in a different program bank.

"program bank" is any bank, savings institution or other financial institution that holds an aggregated account in the program.

One object of the invention is to reduce risk of loss of funds. A problem has been discovered that causes un-insurance for client funds and/or enhanced risk for uninsured client funds. Various situations can cause an un-insurance situation in an account. For example, if second or subsequent sweep purchases after program bank balances have been set for the period or after a daily bank settlement time are concentrated in high balance accounts or if the second sweep purchases for a given account exceed the FDIC insurance limit, an un-insurance situation may occur. Such un-insurance of a given account can also occur due to anomalies in the allocation algorithm used to allocate amounts and client accounts across a plurality of program banks. It has been discovered that this un-insurance condition can be eliminated or reduced by performing fund swaps between funds of the account that contains uninsured funds and another account at a different program bank selected based on one or more criteria. Further, it has been discovered that by forcing the allocation of low balance accounts to all program banks (except in some embodiments selected banks such as one or more designated safety banks and/or holdback bank), such a swapping procedure can be further facilitated. In one embodiment, a modeling algorithm may be used based on anticipated purchase size, and the distribution of purchases across account size to determine a correct dollar target for small accounts distributed across the program banks in order to achieve insurance protection for a predefined level of purchases. The swapping process can then be performed to associate funds to other program banks to obtain insurance or to obtain increased safety for the funds.

In one embodiment, the invention is designed to operate in the context of a system comprising multiple program banks and a management entity (which may or may not be a financial entity). One intent of such an embodiment is to provide insurance for the clients of various financial entities above an FDIC insurance limit for a single account and/or to associate uninsured funds with one or more safety banks. For example, in one embodiment, there could be twelve program banks comprising program banks 1-10, and a holdback bank and a safety bank. (The number of banks used in this example is merely for explanatory purposes. More or less program banks can be used and more holdback banks and/or safety banks can also be used consistent with the intent of the present invention. Also other types of accounts may also be used in conjunction with bank accounts, such as non-FDIC insured money market accounts to hold excess funds, consistent with the intent of the present invention). Assume that a broker dealer financial entity has a program offering $1 million of FDIC insurance per client account. A client A of this broker dealer financial entity deposits $1,500,000 with the broker dealer. The system of this embodiment receives sweep data from this broker dealer including purchase data and withdrawal data for a plurality of clients of that broker dealer, including the $1,500,000 purchase for client A. These funds may be first brought into the system via a control account in an intermediate bank. The system operates to distribute the purchases across the program banks 1-10. For the case of the $1,500,000 deposit for client A, an amount such as $95,000 may be distributed to each of program banks 1-10 to obtain insurance for $950,000. Note that the remaining $550,000 for the deposit may then be deposited in a safety bank to provide insurance of $50,000 up to the program limit of $1 million of insurance. Note that in some embodiments the safety bank will ensure $100,000, so that actually $1,050,000 would be insured. The remaining $450,000 is uninsured under this program, but is in a program bank that is considered relatively safer than some other of the program banks.

As noted above, problems may arise when client purchases are received late in the day, after the balances for each of the program banks have been fixed for that day. The only aggregated accounts that can change their balances are in the one or more holdback banks. Additionally, in some embodiments maximum caps have already been set for the program banks for the day. The present invention attempts to maximize insurance for such purchases and/or to provide increased safety for such deposits.

In more detail, FIG. 1 discloses one embodiment, comprising a financial entity, or a management system 100, acting as agent for the financial entity (to be discussed later) that manages in each of a plurality of program bank 130-140 an aggregate interest-bearing account, e.g., a money market deposit account (MMDA). In one embodiment, the MMDA is paired with an aggregate demand deposit account (DDA), both being in the identical name of the financial entity, or its agent (referred to herein as an "MMDA-DDA pair"). In response to client deposit and withdrawal transactions, sweep files with client purchase and withdrawal transaction data are generated by the financial entity and sent to the management system 100. The management system 100 initiates transfers of these funds to the different program banks 130-140 to maximize insurance and based on various other rules. For a given sweep, if the aggregate deposits of all clients for that financial entity exceed the aggregate client withdrawals (a net client credit), then all or some of the funds may be deposited in the MMDA's in the one or more program banks. Conversely, if client withdrawals for all clients of that financial entity or program exceed client deposits (a net client debit), then the program bank may be instructed by messenger or otherwise to transfer funds from the aggregate MMDA to the DDA for subsequent satisfaction of the withdrawal.

As noted, in one embodiment the interest-bearing, insured aggregated accounts in which the managed balances for clients are deposited may be MMDA's. The DDAs are deposit accounts permitting an unlimited number of deposits and withdrawals. The DDA's serve to facilitate the exchange of funds between the MMDAs, the banks, and sources of client transactions (referred to herein as "transaction sources"). If the financial entity or the management system 100 determines that it is necessary to move funds from a particular MMDA (at a particular program bank), it first causes a messenger or other mechanism to have these funds transferred from the MMDA to the DDA member of the MMDA-DDA pair, and second, causes the funds in the DDA to be moved to the financial entity's or its agent's own account or accounts. In some embodiments the funds may moved to a control operating account prior to moving the financial entity's own account. The control account may be registered in the name of the agent for the exclusive benefits of its deposit customers). Then, from these accounts, funds may be further transferred to a third party, such as a transaction source or a customer financial entity (preferably by electronic or other automatic means). If funds are to be transferred into a particular MMDA, the agent either may have them deposited into the associated DDA and then moved into the MMDA, or may have the funds deposited directly into the MMDA. The agent database is updated to reflect these funds transfers.

While in a preferred embodiment, a separate account or set of accounts, e.g., money market deposit account (MMDA) and demand deposit account (DDA), may be set up for each program for each financial entity in each of the program banks, under certain embodiments of the present invention different programs of the same financial entity or different financial entities can be commingled and aggregated. Thus, a financial entity does not have to set up a separate money market deposit account (MMDA) and associated demand deposit account (DDA) for each program at the program bank, i.e., the same MMDA and/or DDA can be used across several programs if registered, e.g., in the name of and offered by the same self clearing financial entity. Accordingly, a single MMDA or other type of account can be set up at each program bank, or multiple MMDA aggregated accounts can be set up at each program bank.

If a financial entity is a clearing firm that provides clearing services for other financial entities (correspondents), then it is not necessary for the correspondents to set up segregated MMDA's and DDA's for their respective programs. Note that a self clearing financial entity is defined as a financial entity that provides clearing services for its clients and/or provides clearing services for other financial entities that are not self clearing but correspondents of the self clearing financial entity. Additionally, the management system 100 may act as an agent for a group of such financial entities so that assets for several financial entity banks or other entities can be held in the same MMDA-DDA pair registered in the name of the management institution 100 at each program bank 130-140. If the same program is being offered by different financial entities, separate accounts may be used for each financial entity that is a self-clearing financial entity. The deposits for the clients of the correspondent financial entities would be held in the self clearing financial entity's MMDA's that are held in a program banks. Thus, for example, if a program bank participates in three programs each run by a different self clearing financial entity, the bank may have three segregated aggregated accounts, each aggregated account associated with a different self clearing financial entity.

The segregated aggregated accounts are preferably money market deposit accounts (MMDAs) registered in the name of the financial entity that manages the program associated with the MMDA. However, any other suitable investment accounts may be used, such as NOW accounts for individuals, or DDA's. Moreover, more than one type of account could be used, e.g., an aggregated MMDA paired with and an aggregated DDA at each program bank as noted above. In some embodiments, a management system 100 may maintain account information for each of the financial entities and others in a database within its own system or have such a database maintained for its use.

Figure 6:
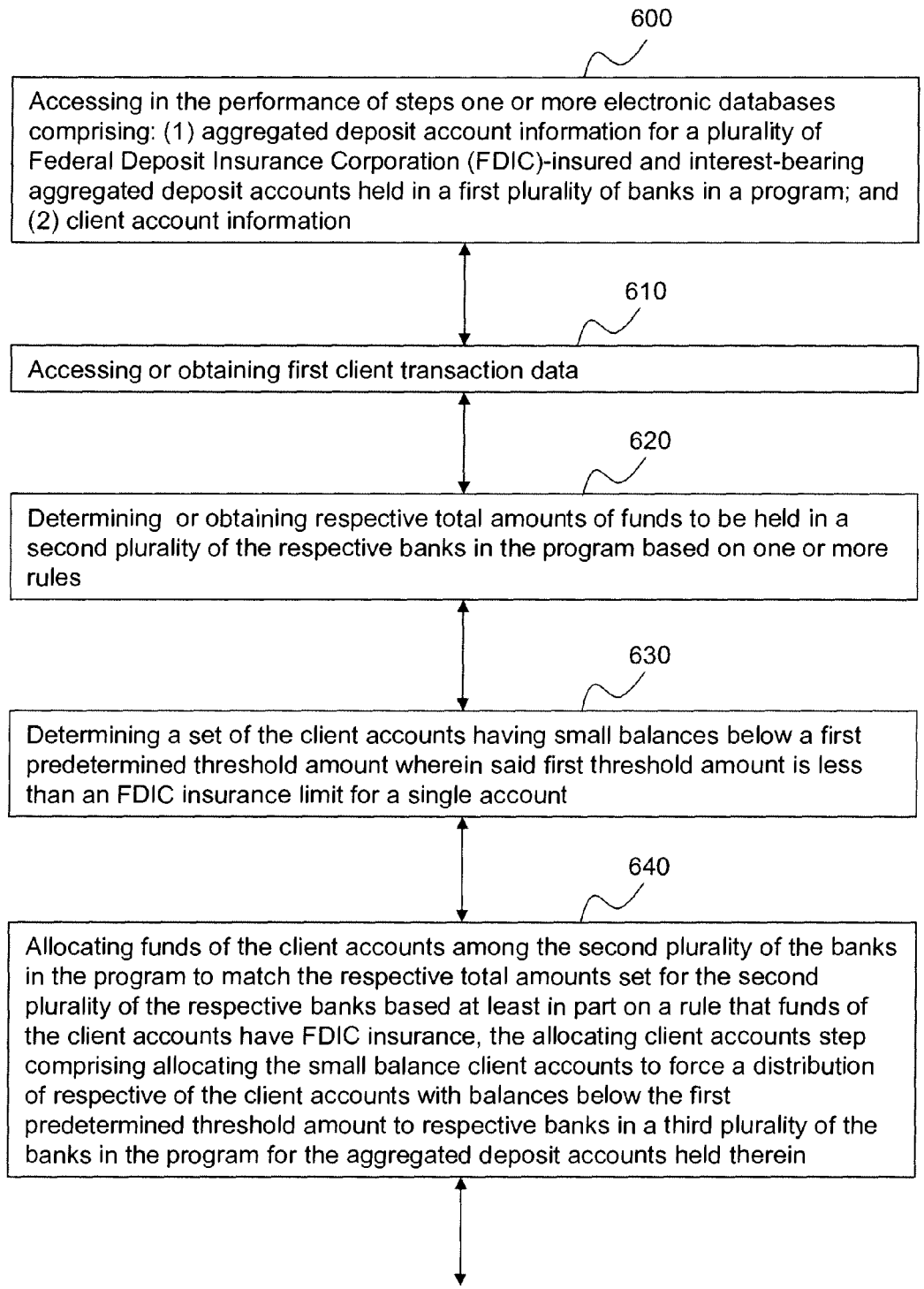
FIG. 6 is a schematic block diagram of a further embodiment.
Figure 6:
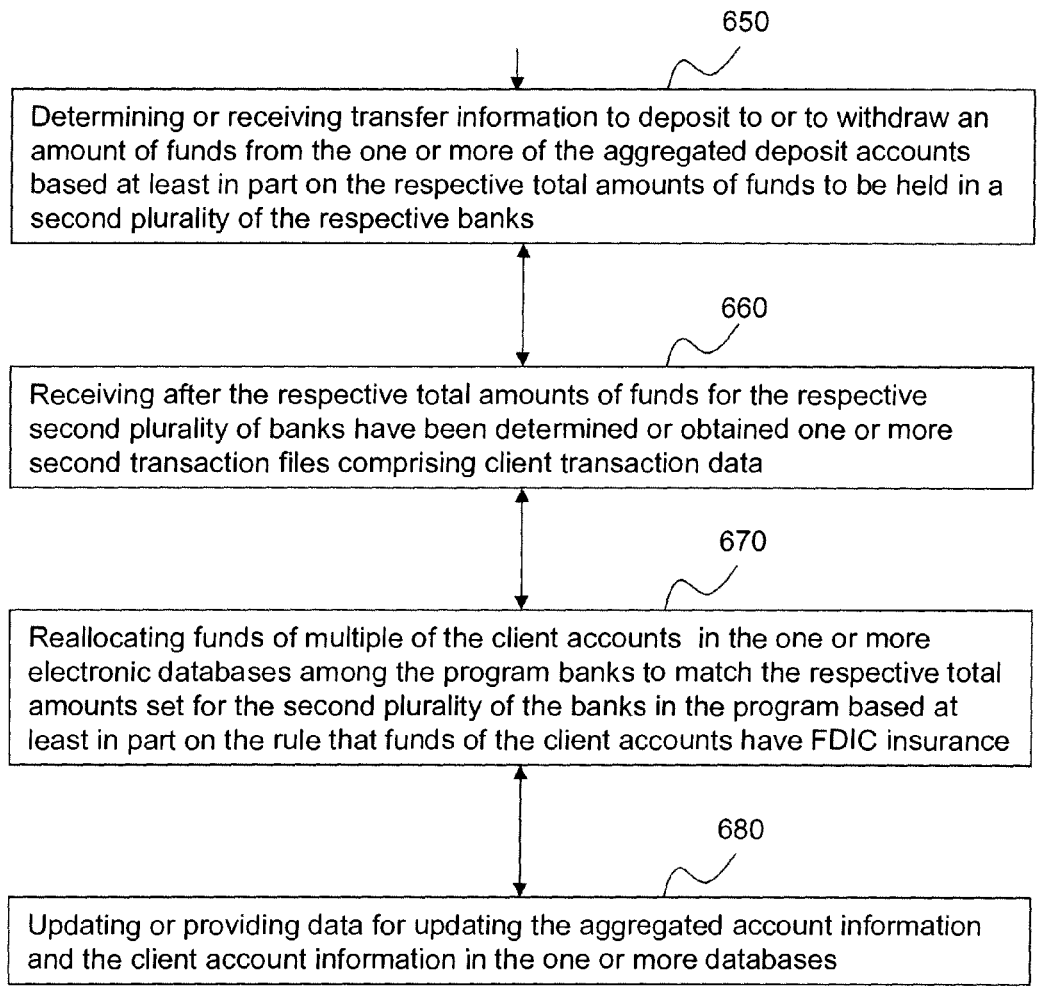

In one embodiment of an insured deposit and safety program, multiple sweep files are received from one or more financial entities associated with the system 100 over the course of a period such as a day. Each sweep file contains transaction activity from one or more financial entities. The timing and content of the received sweep file is determined as a matter of administrative convenience based on how the client transactions are processed by their respective financial entities. In one embodiment, a sweep file may comprise data for deposit and withdrawal transactions for one or more programs in which that financial entity is participating. Multiple sweep files may be received at the same or different times of the day. In this respect, see blocks 610 and 660 in the flowchart of FIG. 6, for example. Similarly, in another embodiment, a given sweep file may be an aggregation of sweep files from a given financial entity and various correspondent entities. For example, a self clearing financial entity would not send to the system a separate sweep file for each of its correspondent entities. Rather all activity for the self clearing financial entity is included on the sweep file, along with the transaction activity for all correspondents and/or programs.

An embodiment for processing sweep files will now be described:

1. Processing for the First Sweep File:
   i. A first program bank target amount allocation—This process incorporates the first sweep purchases and redemptions into the respective client accounts of the financial entity. The process further includes any prepaid interest, and holdback accounting. The process then allocates target amounts to the respective program banks associated with the program based on one or more rules. Such rules may include, for example, ensuring that a given amount allocated fits within a respective maximum bank cap and minimum bank cap set for the respective program bank. In this respect, see blocks 620 and 640 in the flowchart of FIG. 6. In one embodiment, these target amounts are then fixed for the remainder of the period. Note that in other embodiments, the bank amount may be fixed as part of a later sweep processing.
   ii. A first account allocation—This process then allocates all client accounts across the program banks participating in the system to fit the bank amount allocation above and attempts to obtain the maximum FDIC insurance under the particular program or programs associated with the sweep data.
2. Processing for a Subsequent One or More Later Sweeps:
   i. A second transaction allocation—This processing incorporates the second sweep purchases and redemptions into the respective client accounts of the financial entity.
   ii. Second account allocation—This process incorporates daily interest payments to liquidated accounts, interest adjustments, and then reallocates all accounts across the program banks to fit the fixed amounts allocated to the respective program banks.

As noted in the summary above, the management system 100 is designed to run a first allocation that comprises two allocation processes: a bank amount allocation process, which allocates fund amounts between/among the banks 130-140, and a client account balance allocation among the plurality of the program banks to attempt to maximize insurance under the program.

The following describes this process in more detail:

First Bank Amount Allocation:

This process incorporates the first sweep purchases and redemptions into the respective client accounts of the financial entity. The first bank allocation then assigns fund amounts to the program banks based on various rules, such as fitting within maximum bank caps, minimum bank caps. For fully liquidated accounts and incorporates a "holdback" amount from a holdback process in to the bank amount totals.

Regarding prepaid interest, in one processing embodiment interest on accounts is posted at month end. Pro-rated interest amounts are therefore not included in account balances on a daily basis. However, if an account is liquidated during the month, prepaid interest (interest for the number of days the account was active in the month) may be included in the liquidation amount. Liquidations included in the first sweep (as withdrawals) include this prepaid interest amount. In order for the process to balance, the prepaid interest amount may be added to the account balance, (matching the liquidation withdrawal, which comprises the full account balance). For the process to balance, the management company or financial entity may also fund prepaid interest for full liquidations. In such an embodiment, the system tracks the prepaid interest by the program bank so that the Management Company can reimburse itself at month end, when interest is posted. Otherwise the balance at the program banks would be overstated by the prepaid interest amount.

A holdback process may be used in one embodiment to receive late day activity (e.g., second dollar sweep data that includes late day client purchase and withdrawal data). In the hold-back procedure for funding late withdrawals, funds are held back from one or more selected program banks, designated holdback banks, to cover the late withdrawals. A bank may be designated a holdback institution if it agrees to a temporary withdrawal of funds from its account which may be later used to settle late day client service and fee transactions, for example, transactions for credit/debit cards/checks/ACH/fees, to name a few, that may be available for processing after the daily bank settlement deadline, typically 4:00 pm, i.e., they will take funds only up to 4:00 p.m. The amount held back from pre-cutoff transactions may be estimated based on prior transaction history. The holdback withdrawal may be factored into the first runs and/or later runs of the bank allocation process on the sweep files. The allocation process will take into account the amount to be held back at a holdback bank in its distribution of funds allocated to or withdrawn from the given bank. If the distribution of funds for the holdback bank is a credit, the allocation process may reduce the deposit to the bank by an amount equal to the hold back amount. If the distribution of funds for the holdback bank is a debit, the allocation process may increase the withdrawal from the holdback bank by an amount that is equal to the hold back amount.

To facilitate this process, in one embodiment a daily holdback amount is defined prior to the first bank amount allocation and the first account allocation. As noted, a balance at the holdback bank is reduced by the previously defined holdback amount at the end of the first allocation. This money is debited from the holdback bank and wired and credited to the program's control account which, in one embodiment, is held in an intermediary bank, which may or may not be a program bank. The account at the intermediary bank could comprise an only a DDA control operating account, or it might comprise a DDA control operating account that also has an associated MMDA) The money is 'held back' with the intention of offsetting actual redemptions coming in with second or later sweep activity.

In one embodiment of the process, all of the program banks in the program (except in some embodiments the holdback bank and/or the safety bank) receive one wire a day as part of the sweep processing and first bank account allocation. The bank balances resulting from the bank amount allocation and account allocation become 'target balances' for account allocations for subsequent sweep processing. Note that in some embodiments, the target balances for the aggregated accounts may be set after processing for a later sweep and allocation.

Referring to the bank amount allocation process, this allocation process may serve one or more of several purposes, such as, for example, to maintain substantially stable deposit funds at a bank by a financial entity or a management institution by limiting deposit/withdrawal activity, to ensure that activity at the banks 130-140 comply with federal regulations such as FDIC regulations, to ensure compliance with a credit policy, and to insure compliance with specific rules set by the client, the Financial entity, or the branch.

First Account Allocation Processing:

The first account allocation process allocates all accounts with balances (all non-zero balance accounts) to the program banks 130-140. The balances allocated include the effect of any purchases or redemptions in the first sweep file data. Effectively, this process "reshuffles" the new, full account balances across the program banks to match to the amount allocation made previously for the respective program bank.

In one embodiment, after the respective purchases and redemptions have been processed, the accounts are grouped by taxpayer identification number (TIN) and sorted in descending order based on total TIN balance (highest to lowest). The allocation proceeds account by account to determine which program banks will receive the customer financial entity balance (comprising the day's opening balance for the account, plus first sweep purchases, minus first sweep redemptions for each account). The allocation method distributes the account assets to the Program banks based on the TIN balance and based on the type of allocation business rules set for that client account. Note that the business rules may be attributed to an account directly at the client account level, or to multiple accounts at the broker or office/branch level. Some example business rules comprise:

1. The client account's balance must be allocated to banks in a specific deposit sequence, e.g., the first $95,000 to program bank 130, the next $95,000 to program bank 132, etc.
2. The client account's roster of available program banks varies from that of the overall Program (client bank exclusions, e.g., 'opt-out').
3. The requested deposit limit for a given program bank is less than the maximum FDIC Insurance limit for the given account type (currently $100,000 for an individual account).
4. A maximum cap and minimum cap associated with the respective program bank must be satisfied.

The client account balance allocation/reshuffling step may be subject to various additional account specific rules and financial entity office/branch office level rules. In one embodiment of business rule priority, client account specific rules may be used first to direct the client account balance allocation. If the client has opted out of a particular destination bank, for example, because the client has funds in that bank via an account with another financial entity, or the client has designated that the first $100,000 is to be deposited in a particular bank, then such client account balance allocation will follow these rules in making the allocation of that client's balance. Then financial entity office/branch level allocation business rules may be followed in allocating multiple accounts of the given financial entity in an order and amount specified by the applicable rule(s). Thus, the client account balance allocation process thus first allocates non-zero balance accounts according to client account specific rules, then follows office/branch level Business Rules in a descending aggregated account balance order. Finally, the client account balance allocation process will then allocate non-zero balance accounts not subject to any of the above applicable Business Rules in descending account balance order. The allocation/reshuffling of client account balances may also follow certain other business rules to minimize the volume of account balance redistributions required to match with the destination program bank amount allocation. Likewise, a rule may be followed that no more than six withdrawals in a particular manner may be made from a given program bank during a period such as a month. Other allocation rules may be set by the individual account holder, the broker dealer, and the financial entities, and the management system 100.

Accordingly, in one embodiment, the process first allocates accounts that have opt out instructions. It then allocates the accounts from largest to smallest, to ensure that the bank capacity is first used to cover the accounts that need more than one bank. For example a million dollar account would need at least 10 banks. After all of the accounts that need two or more banks have been allocated, the process then determines the number of accounts that need only one bank (less than program limit per bank) and the number of program banks that are below their assigned max deposit cap and can still take assets. The process then divides the number of accounts by the number of available banks. The process then starts allocating these accounts across the banks.

Thus, in one embodiment, the total maximum deposits a program bank will receive in its aggregated account is limited by a pre-determined maximum bank cap, and likewise individual account balances at a particular program bank are limited to an amount below the FDIC insurance limit, for example, $95,000 per program bank for the first $1 million. In one embodiment, any amount greater than $1 million is deposited to a Safety bank and is uninsured.

As noted, in some embodiments a safety bank is designated. The 'safety bank' receives the deposits for all of the account balances in excess of the insurance limit provided by the program. The safety bank is generally one of the larger and more stable banks in the program and so is less likely to experience bank failure. In one embodiment, the safety bank may be selected at the broker level or the client level. If that selected bank is opted out for a particular account, then the bank with the highest capacity is used for that account. Note that due to opt-out and other rules, there may also be multiple safety banks. The safety bank for a given client may be selected by rule.

Referring again to FIG. 1, the management system 100 is configured to allocate and manage deposits, withdrawals and other transactions relating to each of the aggregated accounts in each of the program banks 130-140. Thus, the management system tracks the net activity for the aggregated accounts maintained by the financial entity or the management system 100 itself at the program banks 130-140 based on information generated by it own computers, e.g., wires and allocations, and/or sent from the financial entities to the management system 100 and/or from other appropriate sources via contract or otherwise. The management system 100 maintains records or has maintained for it records on each financial entity and their respective clients with funds in the program banks managed by the management system 100, whether the financial entity is self clearing or not. Thus, in one embodiment, the management system 100 maintains accounts records for all of the client accounts of the financial entities with funds managed by the management system 100.

As explained more fully below, the management system 100 may automatically generate reports, for example in the form of e-mail messages, text messages, faxes, etc., advising the financial entities of the day's net activity for the aggregated accounts in the multiple program banks holding funds for that financial entity, and/or activity in one or more client accounts of that financial entity. If more than one aggregated MMDA account is maintained at a program bank 130-140, each account may be settled separately. The management system 100 maintains or has maintained for it computer software and/or hardware located at a main management system site, or at one or more remote sites that is in communication with the management system 100, that maintains databases and other program functions to track the activities in the various aggregated accounts in each of the program banks 130-140. Examples of such computer software and/or hardware will be discussed below.

Subsequent Sweep Processing After the Program Bank Target Amounts Are Set: Account Processing:

As noted earlier, there may be multiple sweeps and multiple sweep processes run. See for example, blocks 610 and 660 in the flowchart of FIG. 6. When data for a last sweep of the day arrives (referred to in this embodiment as the "second sweep"), the second bank allocation process wires from the control account in the intermediate bank to the holdback bank the net of the holdback amount and all second sweep transactions, including:

second sweep purchases second sweep redemptions.

Reports and wiring instructions are also generated from this process. This second bank allocation process allocates these items to the respective client accounts. As previously noted, the balances in the program banks after the first allocation in this example become the target balances for the account allocation for the remainder of the period, which in some embodiments will be a day. These balances are used by the second account allocation as the effective maximum and minimum cap for each program bank.

If the total of the sweep activity is a net redemption, then the net redemption amount is taken from the funds in the control account and the unused holdback amount is wired back to the holdback bank. If there is a net purchase then the total holdback amount plus the purchases are wired to the holdback bank.

Second Account Allocation:

The second account allocation in one embodiment uses substantially the same logic/rules as described under the first account allocation above. Thus, the second account allocation process allocates all accounts with balances (all non-zero balance accounts) to the program banks using an account selection order that may be of the type described previously or a different order based on one or more rules. The second account allocation reallocates or reshuffles the individual accounts to banks to fit the target balances set previously at the respective program banks. See block 670 in the flowchart of FIG. 6, for example.

A post sweep swapping process is then used to attempt to insure uninsured funds, and/or to ensure that any uninsured funds are for those accounts that make purchases that day, and/or to attempt to ensure that any uninsured funds are placed in the Safety bank. This swapping process will now be described.

Note that the process is not limited to receiving just an AM and PM sweep file. For example, there can be multiple AM sweeps and numerous PM sweep files, whereby only the holdback bank balance can changes.

As noted for FIG. 1, the management system 100, manages the depositing of purchases from sweep data and/or a plurality of client demand accounts for one or more clients, into a plurality of FDIC-insured and interest-bearing aggregated accounts 130-140, each different aggregated account held by a different program banking institutions, so that FDIC insurance coverage greater than the maximum FDIC insurance coverage allowed for each account in a FDIC-insured program banking institution is effectively provided for each client. In one embodiment, a manner of making said withdrawals and/or transfers from at least one of said FDIC-insured and interest-bearing deposit accounts preserves that account's interest-bearing status regardless of the number of said withdrawals and/or transfers from the at least one of said FDIC-insured and interest-bearing aggregated accounts made during a month. See block 650 in the flowchart of FIG. 6, as an example.

FIG. 1 is designed to illustrate the system and process that occurs after the cut-off time for one or more program banks. If the net activity is a debit, the process transfers hold back funds from the control operating account to the broker dealer or financial entity to pay for the debit transactions. Any funds held back in the control operating account but not needed to cover the debit transactions, are then deposited back into the hold back bank, e.g., they are wired from a control account in an intermediate bank 120 to the holdback bank 110. The dollar amount of the net debit is then wired to the financial entity to pay for the sweep transactions. If the late sweep is a net credit, the financial entity wires funds to the control operating account in the intermediary bank 120, and those funds plus the hold back amount are then deposited into the hold back bank 110.) An allocation of client account balances among the plurality of program banks is then performed, as previously described. In this process, only the holdback bank 110 will change its balance of funds in its aggregated MMDA account. After this account allocation, any excess amount for a given client above the FDIC limit in the holdback bank or another of the program banks will be un-insured unless a further process is performed to facilitate swapping out the excess amount to one or more of the program banks. However, it has been discovered that even this swapping process will not work in some embodiments unless there is a distribution of low balance accounts across the program banks, but excluding a subset that may include the holdback bank.

Figure 2:
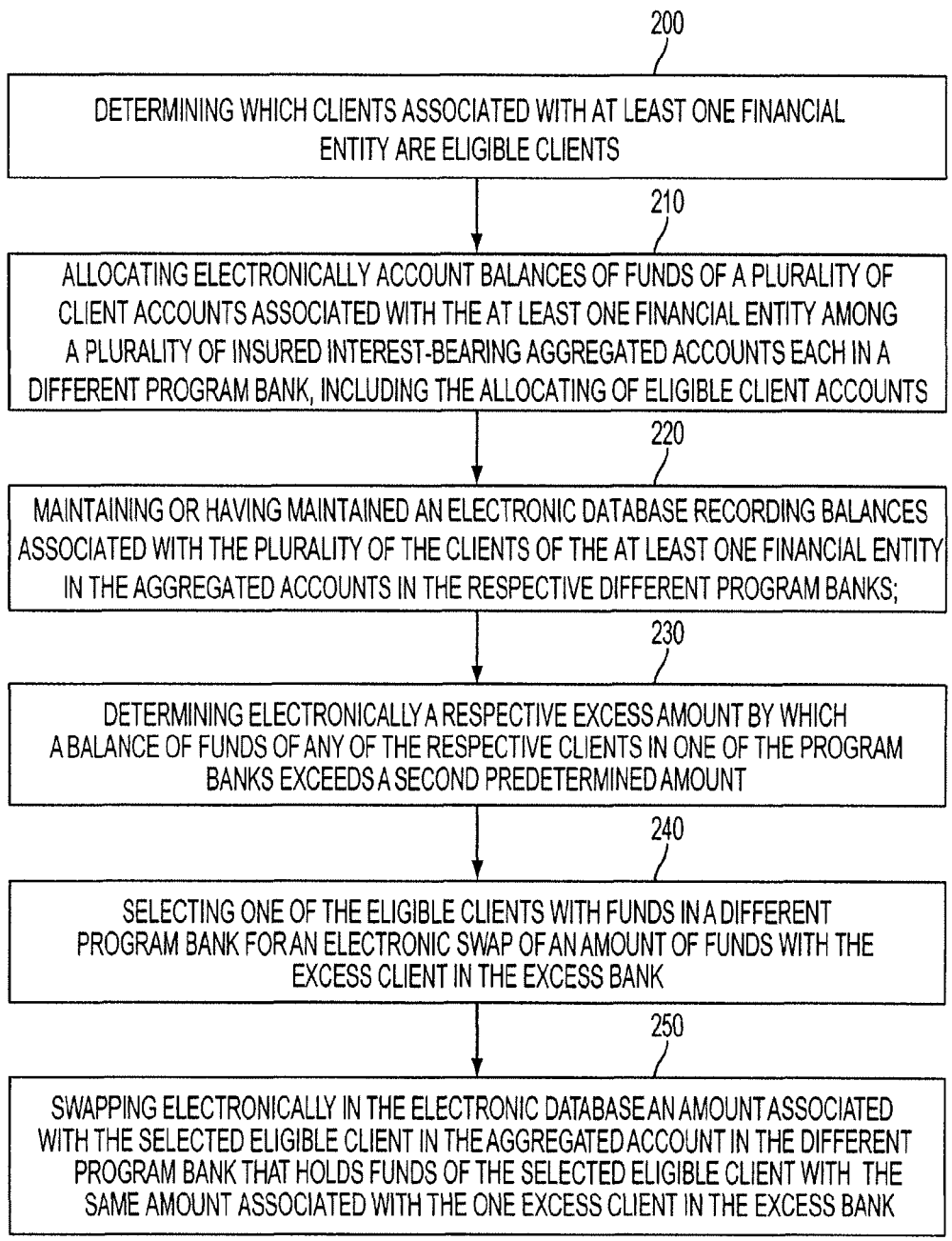
FIG. 2 is schematic block diagram of a further embodiment.

FIG. 2 illustrates one embodiment of the process of the invention to obtain insurance for excess client amounts in one or more excess banks. Referring to block 200, a step is provided of determining which clients associated with at least one financial entity are eligible clients, wherein an eligible client comprises a client with an account balance associated with the at least one financial entity below a first predetermined amount. See also block 630 in FIG. 6. In one embodiment, another criterion for an eligible client is that he/she has an account balance in the holdback bank of less then a second predetermined amount. In one embodiment, the first predetermined amount can be $95,000 or less, and the second predetermined amount associated with the eligible client in the holdback bank could be zero which is preferred since the entire balance of the eligible account could be swapped, if needed.

Referring to block 210, the step is provided of allocating electronically account balances of funds of a plurality of client accounts of a plurality of the clients associated with the at least one financial entity among a plurality of insured interest-bearing aggregated accounts 130-140, each different aggregated account held in a different one of a plurality of the program banks. This account balance allocating step further includes allocating accounts of the eligible clients among each of a plurality of the program banks. In one embodiment, a small balance account distribution process may be run to provide a mechanism to determine a net amount of small account balances to be forced to every bank in the program, other than the safety bank, when used, and a holdback bank, e.g. $20,000,000 in small accounts to every bank other than the safety bank, if used, and the holdback bank. See also block 640 in the flowchart of FIG. 6. In essence, this process modifies the normal sweep processing to force the mapping of small client accounts to the specified program banks, up to the predefined amount. In one embodiment analysis and modeling may be used to define the target small account balance per bank. Such modeling may be based on historical trends to determine a range of second sweep purchases and to determine a cushion beyond that amount as a safety margin of error for absorbing unusually high second sweep purchases. Operational modeling may be performed to derive the amount of small accounts to be distributed to all program banks in order to provide insurance up to the program insurance amount.

In one embodiment, the goal of the process is to have the low balance accounts spread across at least 11 banks. This allows a late purchase of up to $1 million to be fully insured. The more program banks that have small accounts balances (swappable assets), the greater the degree of flexibility to allocate late day purchases. The electronic process determines the number of client accounts that have a balance of less than $100,000 and spreads these accounts across all of the banks in the program except for a subset of the program banks. As noted, the dollar amount allocated to a program bank may, in various embodiments, be dependant upon, opt outs (clients can chose not to have their funds deposited in one or more banks), the deposit maximum cap set for the program bank and whether or not the program bank is needed to provide additional insurance for other clients with balances greater than $100,000.

Note that modeling for the small account distribution may be run at the beginning of the period or at some convenient time, preferably before the respective maximum caps for the program banks are set. At the point in the electronic process after the model has been run to determine the number of program banks needed to spread the small accounts for a given level of predicted late day purchases, the maximum deposit caps can be adjusted for one or more of the program banks to ensure that there is room under the deposit cap to fit these low balance accounts. For example, if the model predicts late day purchases for that day to be $25 million, the modeling process will determine the number of banks needed to spread the small accounts and then electronically adjust the maximum deposit caps accordingly to fit these small accounts across the multiple program banks.

Note that the low balance accounts below the first predetermined amount, in one embodiment may be distributed in the first account allocation. This timing is advantageous since the balances at the different program banks can change after the first account allocation. The processing for later sweeps that includes account allocations across the program banks should attempt to substantially maintain the distribution of the low balance accounts made in the first sweep processing, i.e., eligible accounts, across the program banks, with the exception of a subset of the program banks, such as the holdback bank and, in some cases, a safety bank.

Note that the allocation of the eligible accounts/low balance accounts across the program banks could also be performed as part of the processing for subsequent sweeps after the respective balance amounts for the respective program banks have been fixed for the day. However, for such sweep processing, only the balance at the holdback bank can change. Thus, the mix of client accounts allocated to a program bank can change, but the balance for the aggregated account in the program banks cannot change. Thus, allocating the eligible/low balance accounts as part of a sweep processing when the respective balances in the aggregated accounts in the program banks have not been fixed provides the most leeway.

Referring to block 220, the step is provided of maintaining or having maintained an electronic database for recording balances associated with the plurality of the clients of the at least one financial entity in the aggregated accounts in the respective different program banks.

Referring to block 230, the step is provided of determining electronically a respective excess amount by which a balance of funds of any of the respective client accounts in a given one of the program banks exceeds a second predetermined amount so that at least a portion of this excess amount over the second predetermined amount is uninsured in the given program bank. If one of the clients has been determined to have an amount of funds that exceeds the second predetermined amount in the given bank, that client is referred to as an excess client holding excess funds in an excess bank. By way of example, the second predetermined amount could be set to $95,000. Note that in many instances, the excess bank will be the holdback bank 110.

In one embodiment, the process extracts all accounts that are uninsured by determining those accounts with balances at a program bank above the FDIC insurance limit. It may then discard any account that is uninsured because its account balance exceeds the program limit for that financial entity (or designate the excess over the program limit for a swap with a safety bank, to be discussed below). For example if an account had $2 million and the program offered $1 million in insurance and the client was insured for the first million, the process would by-pass this account. However if the account had $2 million but was only insured for $800,000, the system would look to provide insurance for $200,000 that was uninsured. Accordingly, the process proceeds account by account looking for an account to swap.

Referring to block 240, the step is provided of selecting one of the eligible clients with funds in a different program bank for an electronic swap of an amount of funds with the excess client in the excess bank.

Referring to block 250, the step is provided of swapping electronically in the electronic database a third amount associated with the selected eligible client in the aggregated account in the different ("receiving") program bank that holds funds of the selected eligible client with an amount equal to the third amount associated with the one excess client in the excess bank. In one embodiment, the swapping step comprises allocating electronically in the electronic database to the excess bank the third amount of funds of the one eligible client from the aggregated account in a different bank that holds funds of the one eligible client and associating this third amount in the excess bank to the one eligible client; and reallocating electronically in the electronic database from the excess bank an amount equal to the third amount associated with the one excess client to the aggregated account in the different bank, and associating to the excess client this third amount in the aggregated account in the different bank, to thereby reduce the funds held in the excess bank associated with the one excess client.

Note that in one embodiment, the swapping process may be used to move uninsured amounts to a safety bank. This situation might occur if there are not enough balances available for swapping with this excess client. Additionally, this uninsured situation could occur if one or more of the program banks had reached their max cap capacity. Additionally, this uninsured situation could occur where a client balance exceeds a program limit. For example, a client may have a balance in its account with the financial entity of $1,200,000, but is participating in a program where the maximum FDIC insurance provided is for $1,000,000. The amount above the program limit could be swapped to move it into the safety bank. Note that not every program uses a safety bank. If the program does not use a safety bank, then the uninsured assets are allocated to any program bank that has capacity.

It should be noted that the present process can be performed in an iterative fashion, wherein eligible client account balances are swapped with an equal amount in the excess bank to decrease the excess amount of the excess client in the excess bank. As an example, for a $300,000 after hours deposit by an excess client X held in the holdback bank, $200,000 must be swapped out of the holdback bank for that excess client in order to obtain insurance. This swap could be performed by first swapping with a $90,000 balance of an eligible client in program bank B. Then a swap could be performed with a $70,000 balance of an eligible client in program bank C. Then a swap could be performed with a $40,000 balance of an eligible client in program bank D. Thus the swapping process could be performed on the excess client balance of a client Y in the holdback bank, preferably until all of the uninsured excess client funds have been swapped with the program bank.

Alternatively, a single composite swap could be performed for multiple excess client amounts with each program bank. Alternatively, an excess balance for single excess client or a composite excess balance for multiple excess clients could be swapped with multiple of the program banks 130-140 at substantially the same time.

In a further embodiment, the selecting step selects an eligible account with an account balance in the excess bank of less then a fourth predetermined amount. In one embodiment, this fourth predetermined amount could be zero, to thereby maximize the amount that can be swapped with the excess client.

In one embodiment, the step of allocating electronically account balances of funds of a plurality of client accounts that includes allocating accounts of the eligible clients among each of a plurality of the banks is a first allocation of a period, such as a day. This would typically occur after the first sweep file was received and the transaction data therein processed.

In a further embodiment, the step of allocating electronically account balances of the eligible clients among each of a plurality of the program banks is performed after a step of allocating a respective amount to each of a plurality of the respective program banks, which respective amount is then fixed for the remainder of the period for its respective program bank.

In a further embodiment, the allocating balances of eligible clients step does not allocate eligible client balances to a holdback program bank.

In a further embodiment, the allocating balances of eligible clients step does not allocate eligible client balances to either a holdback program bank or a safety bank.

In yet a further embodiment, a step is provided of selecting at least one additional eligible client for an electronic swap; and wherein the swapping step comprises swapping a fifth amount that is a composite of the third amount associated with the one eligible client and an additional amount associated with the at least one additional eligible client with an amount equal to the fifth amount associated with the one excess client. In other words, a composite amount made up of the sum of amounts from multiple eligible clients could be swapped with an excess amount equal to this composite amount.

In yet a further embodiment, the steps are provided of selecting a high account balance of a high balance client associated with the at least one financial entity that is above the first predetermined amount and that is held in a plurality of the aggregated accounts in a plurality of the program banks. In one embodiment, the electronic selecting the high balance account step could also include the criterion that the high balance account have an account balance in the excess bank of less then a predetermined amount, which could be zero. The step would then be performed of swapping electronically in the electronic database a sixth amount associated with the high balance client from one of the program banks that holds funds of the selected high balance client to the excess bank and an amount equal to the sixth amount associated with the one excess client in the excess bank to the aggregated account in the one program bank.

In a further embodiment, the eligible client is selected based at least on a criterion of maintaining insurance coverage for the amount to be swapped in both the different program bank and the excess bank. This means that the swapping process should not make a portion of the funds of the eligible client uninsured. The process in one embodiment will first look for an account in a deposit banks where the excess client does not have funds, and it will not deposit more than the program limit in an bank other than the safety bank. The process then looks for other clients that can be swapped and maintain their insurance. For example, an eligible client could have a balance in the hold back bank that is less than the program limit per bank. If needed the process will swap additional funds to the hold back bank for that eligible client up to the maximum program limit. (Ex 95,000). If the eligible client had a balance of $70,000 in program bank A, and $25,000 in the hold back bank, then the $70,000 in bank A would be eligible for a swap to the holdback bank. Note that this swapping operation also works with high balance client accounts. For example, if the client had a balance of $120,000 and had $95,000 in Bank A and $25,000 in the hold back bank, then $70,000 of the $95,000 in bank A would be eligible for a swap.

In yet a further embodiment, the selecting of the eligible client with funds in the different bank is based, in part, on whether the one excess client has funds in the different program bank holding funds of the eligible client. The reason for this is to maximize the amount that can be swapped with the excess client.

In yet a further embodiment, the selecting of the eligible client is based, in part, on the account balance of the eligible client in the different program bank. In one embodiment, it may be desirable to select eligible client balances that are large, e.g., that approach the FDIC insurance limit, in order to minimize the number of swap operations required in order to insure the full excess amount.

In a further embodiment, the selecting of the eligible client is based, in part, on minimizing a number of swaps required to insure the entire excess amount of the excess client. In one embodiment, this could be accomplished by selecting, if possible based on availability, eligible clients with balances that approach the size of the excess amount, i.e., the process will select the eligible accounts with the highest balance needed first. The objective is to insure the uninsured accounts with the least amount of movement or swaps. For example if an account needs $180,000 of insurance, and the program limit per bank is set to $95,000, the process will look for an account with $95,000 that can be swapped and a second account for the reminder of the balance. If it can't accomplish the swap with two accounts it will use accounts with smaller balances.

In a further embodiment, the operation is provided of repeatedly selecting at least one second different eligible client and performing the swapping step in an iterative process until an entire uninsured amount associated with the one excess client in the excess bank has been reallocated to one or more of the banks.

In a yet further embodiment, the allocating step distributes account balances of the eligible clients among a plurality of the banks based on a criterion of maximizing the amount of excess funds of a plurality of excess clients in the excess bank that can be swapped among a plurality of the banks while still complying with at least one of an eligible client opt-out instruction for one or more of the banks and respective maximum deposit caps associated with the respective program banks.

In yet a further embodiment, the accounts of eligible clients are distributed substantially equally across all of the plurality of different program banks except for a subset of the program banks. This subset could comprise the holdback bank 110 and/or the safety bank.

In yet a further embodiment, a plurality of excess clients are determined, and further comprising selecting excess clients for performing the swapping step based on a prioritization of the excess clients. In other words, based on a priority, the swapping process is performed to insure the uninsured amounts of some excess clients before other of the excess clients. For example, municipal accounts may be given a higher priority for FDIC insurance over other account types such as individual or corporate accounts. By assigning a unique identifier to an account or a group of accounts, these accounts can be given priority for insurance purposes.

In yet a further embodiment, the step is provided of making electronically at a time after the first allocating step a second allocation of account balances of funds of a plurality of the client accounts of a plurality of the clients associated with the at least one financial entity among a plurality of the insured interest-bearing aggregated accounts in the different respective program banks, in order to administer later deposits and withdrawals made after the allocating step, and after a respective amount for a balance of funds in the aggregated account has been fixed for the remainder of a period, such as a day, for each of a plurality of the respective program banks.

In yet a further embodiment, the step is provided of reallocating so that an amount associated with the excess client in the different program bank after the swapping step does not exceed a predetermined amount, such as, for example, $95,000. In other words, the swapping operation should not make a portion of the excess client funds in the different bank uninsured.

In a further embodiment, the step is provided of determining if a client associated with the at least one financial entity is an eligible client with respect to a program bank by determining if a balance associated with the client in the aggregated account held in the program bank is greater than a predetermined amount. In other words, a selection criterion for the eligible client could be a certain minimum balance that is less than the first predetermined amount.

In yet a further embodiment, the step is provided of allocating the account balances in the client accounts associated with the one financial entity among one or more of the aggregated accounts based, at least in part, on one or more rules and a respective minimum cap and/or a respective maximum cap associated with each of the different banks.

In a yet further embodiment, the allocating account balances uses taxpayer identification numbers to identify the respective client accounts.

In a yet further embodiment, the swapping step causes a minimum cap or a maximum cap to be reset for at least one of the program banks in a following period, such as the next day.

In yet a further embodiment, the excess bank may be both the holdback bank and a safety bank.

In yet a further embodiment, where an amount of funds is to be uninsured, swapping an equal amount of these uninsured funds electronically between the excess bank holding the uninsured funds and a safety bank, to thereby provide an additional level of safety for the uninsured funds.

In yet a further embodiment, an audit trail of allocations and reallocations of client funds at each of the program banks is generated. For example, the system could track the allocation among program banks for a client account. In some embodiments, the system may send information that provides an intra day movement among deposit program banks to any outside party. After the last allocation has run for the day, the process then creates outbound files for the program banks and the broker dealer. The bank deposit file sent to the broker dealer may include each client account, and their respective balance at each program bank. A file may also be sent to each deposit program bank that includes the client's BD account number, balance at the deposit bank and the last four digits of their tax id.

In yet a further embodiment, an on-the-fly report of uninsured funds is generated and communicated by some convenient electronic means. The report may be used by an operations department as an audit tool. The report is reviewed daily to ensure that all accounts are properly insured. If an account is uninsured and the account's aggregate balance is below the program limit, an operations group may be tasked to investigate the cause. The uninsured report can be a valuable tool in testing new electronic processes in that it allows the management system to find program bugs quickly.

It should be noted that there may be instances where late day deposits to the holdback bank cause the holdback bank to exceed its maximum deposit cap. In the next period, such as the following morning, the electronic process will withdraw funds from the hold back bank and allocate the funds to other program banks that have not met their respective maximum deposit caps.

In a further embodiment where the holdback bank also constitutes the safety bank, then it may be desirable to move excess deposits to the holdback bank. In that instance, it may be desirable to allocate a prescribed number of low balance/ eligible accounts to the holdback bank to facilitate swapping excess funds that are uninsured to the holdback bank.

In a further embodiment, a program may be run to attempt to ensure that if any client accounts under the program limit will be uninsured for the day, that such un-insurance is limited to accounts that had deposit activity that day and that the uninsured portion of that client's account balance is no greater than the total deposit purchase amount for that day for that client account. This process is implemented in one embodiment by running a program to review all client accounts that are uninsured for that day to determine if there was deposit activity for that client account.

Figure 3:
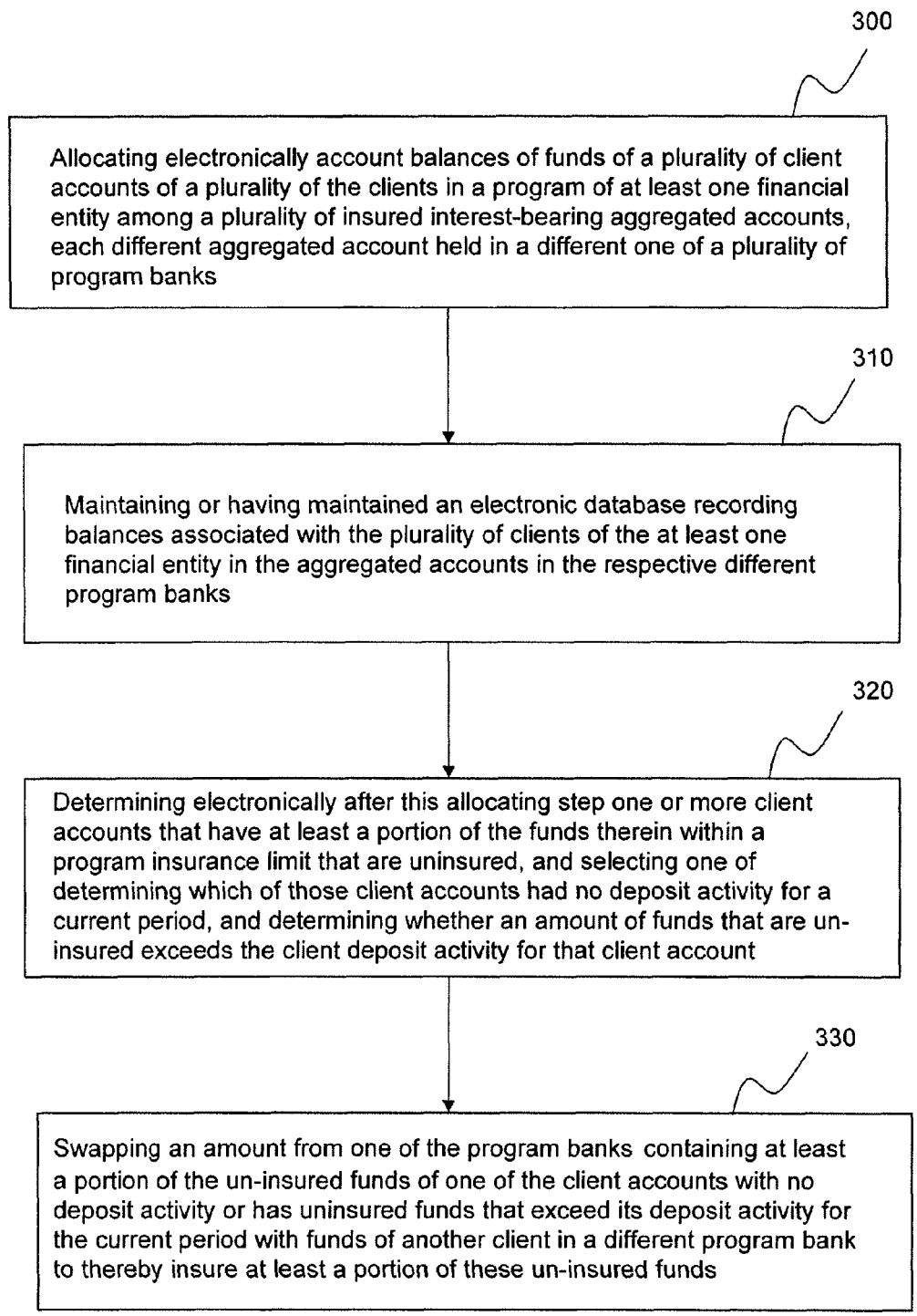
FIG. 3 is schematic block diagram of a yet further embodiment.

Referring to FIG. 3, a method for enhancing safety for funds in aggregated accounts is disclosed. In block 300, a step is provided of allocating electronically account balances of funds of a plurality of client accounts of a plurality of the clients in a program of at least one financial entity among a plurality of the insured interest-bearing aggregated accounts, with each different aggregated account held in a different one of a plurality of program banks 130-140.

Referring to block 310, a step is provided of maintaining or having maintained an electronic database 500 (see FIG. 5) recording balances associated with the plurality of clients of the at least one financial entity in the aggregated accounts in the respective different program banks 130-140.

Referring to block 320, a step is provided of determining electronically after this allocating step one or more client accounts that have at least a portion of the funds therein within a program insurance limit that are uninsured, and selecting one from the group of steps of determining which of those client accounts had no deposit activity for a current period and determining whether an amount of funds that are un-insured exceeds the client deposit activity for that client account.

Referring to block 330, a step is provided of swapping an amount from one of the program banks containing at least a portion of the un-insured funds of one of the client accounts with no deposit activity for the current period with insured funds of another client in a different program bank 130-140 to thereby insure at least a portion of these un-insured funds.

In one embodiment, the step is provided of selecting insured funds of the other client in the different program bank for the swap step of block 330 based at least on part on whether that other client had deposit activity during the current period.

In a further embodiment, the step is provided of selecting insured funds of the other client in the different program bank for the swap of step 330 based at least on part on whether that other client had deposit activity during the current period and on which sweep that deposit activity occurred during the period. For example, the selecting step may be designed to first select insured funds of clients with deposit activity in a later sweep after the amounts have been allocated for the day for the program banks. In some embodiments, this later sweep could be a second sweep occurring after the daily bank settlement time for program banks 130-140. In this example, the amount of funds swapped could in one implementation be limited to funds deposited in this later sweep.

In a further embodiment, the step may be provided of determining electronically after the allocating step of block 300 those client accounts having deposit activity for a current period and with at least a portion of the funds therein within a program insurance limit of the program that are uninsured and for each such client account whether an amount of funds for such client account that are un-insured exceeds the client deposit activity for that account either after a given sweep or for the current period. This embodiment would further include the step of swapping an amount from one of the program banks 130-140 containing at least a portion of the un-insured funds of one of such client accounts having deposit activity for the current period with insured funds of another client in a different program bank to thereby insure at least a portion of these un-insured funds.

In a further embodiment, a step is provided of selecting the other client in the different program bank based, in part, on whether the one client account with the uninsured funds includes funds in the different program bank currently holding the uninsured funds.

For those client accounts where the amount of the un-insurance is greater than the deposit amount for that day for that client or for those uninsured client accounts that had no deposit activity that day, a further swap operation is performed to insure at least the amount in the account that had been insured the previous day. One embodiment of this process uses the following steps:

1. Identifying Uninsured Accounts

A client account TIN Allocation process writes uninsured accounts into a sequential file that may be used later in an Account Insurance process. Uninsured client accounts for this embodiment are accounts that have a balance in any program bank that exceeds an FDIC insurance limit and the overall client account balance associated with the financial entity is equal to or under the limit for the program that the particular client is participating. (If the client account associated with the financial entity exceed the program amount, then the system operates to allocate amounts up to the program limit in the program banks 130-140 and the uninsured portion of the balance in the client account is deposited in the "safety" bank. In this instance, such client account is marked as "insured up to the program limit" and skipped in this account insurance processing.) The creation of the uninsured file is moved from the account TIN allocation process to the account insurance process.

2. Processing Uninsured Accounts in the Uninsured File

The process selects client accounts from the "uninsured" file that was created by account TIN allocation process. A next step is to get a current account balance distribution per program bank to identify which program bank has the uninsured balance ("excess" bank). Starting from the first program bank that has an uninsured balance, the process calculates the uninsured portion of the program bank balance for the given client account. Then the process identifies a different program bank ("receiving" program bank) that is available for a swap and calculates an available swap amount (that may be determined account-by-account, or as a composite) that may be processed with the different "receiving" program bank. A lesser amount may be transferred from the "uninsured" bank to the "receiving" program bank, depending on the size of the uninsured amount. This process is repeated with one or more different receiving program banks until a full uninsured amount is transferred or no more "receiving" program banks are found. Each transferred excess amount associated with the excess client from the excess program bank should be offset/swapped with a "candidate" account balance transfer from the different receiving program bank. If no candidates for the swap are found account will stay uninsured for the current day.

3. Identifying "Candidate" Offset/Swap Accounts in the Different "Receiving" Program Bank A first criterion for selecting "candidate accounts" for the offset/swap are accounts with an existing balance in the "receiving" bank that allow additional insured deposit into the "excess" bank, e.g., that have small or no balance of funds in the excess bank. A second criterion for selecting "candidate accounts" for the offset/swap are accounts with existing balances in the "receiving" program bank and that have a purchase transaction in a second dollar sweep (after the amounts have been allocated to the program banks) on the current day. Those accounts may be uninsured up to the total purchase amount in some circumstances. A third criterion for selecting "candidate accounts" if more funds are needed for the offset/swap are accounts with existing balances in the "receiving" program bank and that have a purchase transaction in the first dollar sweep on the current day. Those accounts could be uninsured up to the total purchase amount.

4. "Safety" Bank Processing

After processing a client account from the "uninsured" file, it is determined whether a "candidate offset" account became uninsured after this swap process. If yes, then a subsequent pass of the process on this uninsured client account is run to try to insure the "newly created" uninsured account. If this client account cannot be insured, then the process attempts to deposit the uninsured portion of the newly uninsured account balance into the safety bank and offsets this transfer with any other account that can be swapped from the "safety" bank to the "uninsured" bank without causing that account to become uninsured. If none of the client accounts can be found for the offset/swap transfer, the uninsured client account will stay uninsured with the uninsured balance in a bank other than "safety" program bank.

5. Account Transaction Audit Trail

The new account insurance process creates a transaction audit trail to record all changes in account bank balances. The transactions are written into an insured deposits transaction history table with transaction type 'XFR', selected "from" and "to" program banks and transferred amount.

6. Uninsured Account Tracking

The new account insurance process will detect whether an account's assets cannot be insured as the program processes/re-allocates on a per account basis. In this manner uninsured client accounts will be written to the uninsured file to capture such client accounts "on the fly," rather than running a subsequent report via time consuming queries. An IDP uninsured account balance report thus will include all uninsured client accounts with a listing of the account current balance and an aggregated TIN balance per program bank.

a. Detailed Account Insurance Allocation Process Flow for one embodiment of a software implementation is provided below:

I. Account Insurance Allocation Process: Mainline.
  Initialize routine.
  Main process routine.
  Go back.
Initialize Routine.
  Get current system date.
  Validate program parms: check IDP Program code.
  Open input file with uninsured accounts.
  Open output file for uninsured accounts report.
  Load account instructions table.
  Load broker/office/correspondent/rep instructions table.
Main Process Routine.
  Process uninsured accounts until end of file is reached.
  Close input file with uninsured accounts.
  Close output file with uninsured accounts report.
Process Uninsured Accounts Routine
  Read uninsured account record from the input file.
  Load current account balance distribution per bank table.
  Identify program bank and uninsured portion of the account balance ("uninsured" bank).
  Identify available for deposit account program bank ("receiving" program bank).
  Identify first "candidate" account in the receiving bank for the swap transfer.
  Create transfer for the uninsured account to transfer uninsured portion to the candidate account in the receiving program bank.
  Create offset transfer for selected account for the same amount.
  Update the database with the "uninsured" and "receiving" program bank balances for the uninsured and offset accounts.
  After swap and update, check the selected uninsured account for a remaining insured balance per program bank. If a remaining balance in any program bank is uninsured for this account, identify a second "candidate" account for a swap transfer in the same of a different receiving program bank.
  Create transfer for the uninsured account to transfer the uninsured portion to the candidate account in the receiving program bank.
  Create an offset transfer from the candidate account for the same amount to the excess program bank.
  Update the database with the "uninsured" and "receiving" program bank balances for the uninsured and offset accounts.
  Check selected uninsured account for insured balance per bank, if balance in any program bank is uninsured write account to the uninsured report.
  Check offset account for insured balance per bank, if balance in any program bank is uninsured, try to deposit the uninsured portion of the account balance into the safety bank and offset the transfer with any other account that could be moved from "safety" bank to the "uninsured" bank without causing that account be uninsured.
  Check offset account for insured balance per bank, if balance in any program bank is uninsured, write account to the uninsured report.

Data Requirements b. Input Database
DB2 tables that will be used Account Insurance Allocation Process:

| | |
|---|---|
| SAS_SYS_CNTL | get system current business date |
| SAS_SYS_XREF_IDP | get IDP funds for selected IDP programs |
| SAS_PROGRAM_IDP | get IDP program specifications |
| SAS_SYS_ORD_FDIC | get broker/office/corr/rep IDP bank instructions |
| SAS_ACCT | get account non-dollar information |
| SAS_ACCT_FDIC | get account instructions order type |
| SAS_ACCT_BAL_FDIC | get account balance distribution per bank |
| SAS_ACCT_ORD_FDIC | get account IDP bank instructions | c. Output database
Following DB2 tables that will be updated (see block 680 in the flowchart of FIG. 6, for example) by Account Insurance Allocation Process:
Record will be inserted into the IDP Account Balance table, when part of account balance should be transferred to the selected program bank and bank record not exists.

| | | | |
|---|---|---|---|
| Insert: | table columns | SAS_ACCT_BAL_FDIC | |
| | | CUST_NBR | CHAR(8) |
| | | ACCT_SEQ_NBR | CHAR(2) |
| | | FDIC_BNK_ID | SMALLINT |
| | | BRKR_AGN_ID | CHAR(4) |
| | | BRKR_ACCT_NBR | CHAR(18) |
| | | PORT_CD | CHAR(2) |
| | | ACCT_BNK_ORD_CD | CHAR(2) |
| | | ACCT_BNK_STAT_FDIC | CHAR(1) |
| | | ACCT_BNK_BAL_FDIC | DECIMAL(13, 2) |
| | | ACCT_INT_MTD_FDIC | DECIMAL(11, 2) |
| | | ACCT_INT_YTD_FDIC | DECIMAL(11, 2) |
| | | ACCT_INT_PRI_FDIC | DECIMAL(11, 2) |
| | | ACCT_WTH_MTD_FDIC | DECIMAL(11, 2) |
| | | ACCT_WTH_YTD_FDIC | DECIMAL(11, 2) |
| | | ACCT_WTH_PRI_FDIC | DECIMAL(11, 2) |
| | | ACCT_WDR_MTD_CNT | SMALLINT |
| | | FDIC_UPD_DT_TM_TS | TIMESTAMP |
| | | FDIC_UPD_OPER_ID | CHAR(8) |
| | | ACCT_DIV_LST_CR_DT | DATE |
| | | ACCT_BNK_BAL_PRS | DECIMAL(18, 8) |
| | | ACCT_INT_MTD_PRS | DECIMAL(18, 8) |
| | | ACCT_WTH_MTD_PRS | DECIMAL(18, 8) |
| | | ACCT_INT_HLD_FDIC | DECIMAL(11, 2) |
| | | ACCT_INT_ADJ_FDIC | DECIMAL(13, 2) |
| | | ACCT_WTH_ADJ_FDIC | DECIMAL(11, 2) |
| | | IDP_PROG_CD | CHAR(7) |
| | | ACCT_WTH_HLD_FDIC | DECIMAL(11, 2 |

Account program bank balance and balance with precision will be updated with the transferred amount in IDP Account Balance table for "from" and "to" program banks. For the audit record, table update timestamp will set to the current timestamp and update oper id will be set to the program id.

| | | | |
|---|---|---|---|
| Update: | table columns | SAS_ACCT_BAL_FDI | |
| | | ACCT_BNK_BAL_FDIC | DECIMAL(13, 2) |
| | | ACCT_BNK_BAL_PRS | DECIMAL(18, 8) |
| | | FDIC_UPD_DT_TM_TS | TIMESTAMP |
| | | FDIC_UPD_OPER_ID | CHAR(8 |

Record will be inserted into the IDP Transaction History table with transaction type 'XFR' for each account balance transfer.

| | | | |
|---|---|---|---|
| Insert: | table columns | SAS_TRAN_HIS_FDIC | |
| | | CUST_NBR | CHAR(8) |
| | | ACCT_SEQ_NBR | CHAR(2) |
| | | TRAN_ADD_DT_TM_TS | TIMESTAMP |
| | | PORT_CD | CHAR(2) |
| | | TRAN_TYP_CD_FDIC | CHAR(3) |
| | | TRAN_FR_BNK_FDIC | SMALLINT |
| | | TRAN_TO_BNK_FDIC | SMALLINT |
| | | TRAN_AMT_FDIC | DECIMAL(13, 2) |
| | | TRAN_EFF_DT_FDIC | DATE |
| | | TRAN_ORIG_TS | TIMESTAMP |
| | | TRAN_SRC_FDIC | CHAR(1) |
| | | TRAN_UPD_OPER_ID | CHAR(8) |
| | | TRAN_ACRU_ADJ_FDIC | DECIMAL(11, 2) |

Program bank daily activity and balance columns will be updated with transferred amount for "from" and "to" corresponding program banks in IDP Calendar Bank Balance table. For the audit record, table update timestamp will set to the current timestamp and update oper id will be set to the program id.

| | | | |
|---|---|---|---|
| Update: | table column | SAS_CALENDAR_FDIC | |
| | | FDIC_BNK_TOT_DEP | DECIMAL(15, 2) |
| | | FDIC_BNK_TOT_WDR | DECIMAL(15, 2) |
| | | FDIC_BNK_BAL | DECIMAL(15, 2) |
| | | FDIC_BNK_NET_PRINC | DECIMAL(15, 2) |
| | | FDIC_BNK_NET_ACTV | DECIMAL(15, 2) |
| | | FDIC_UPD_DT_TM_TS | TIMESTAMP |
| | | FDIC_UPD_OPER_ID | CHAR(8) |

Figure 4:
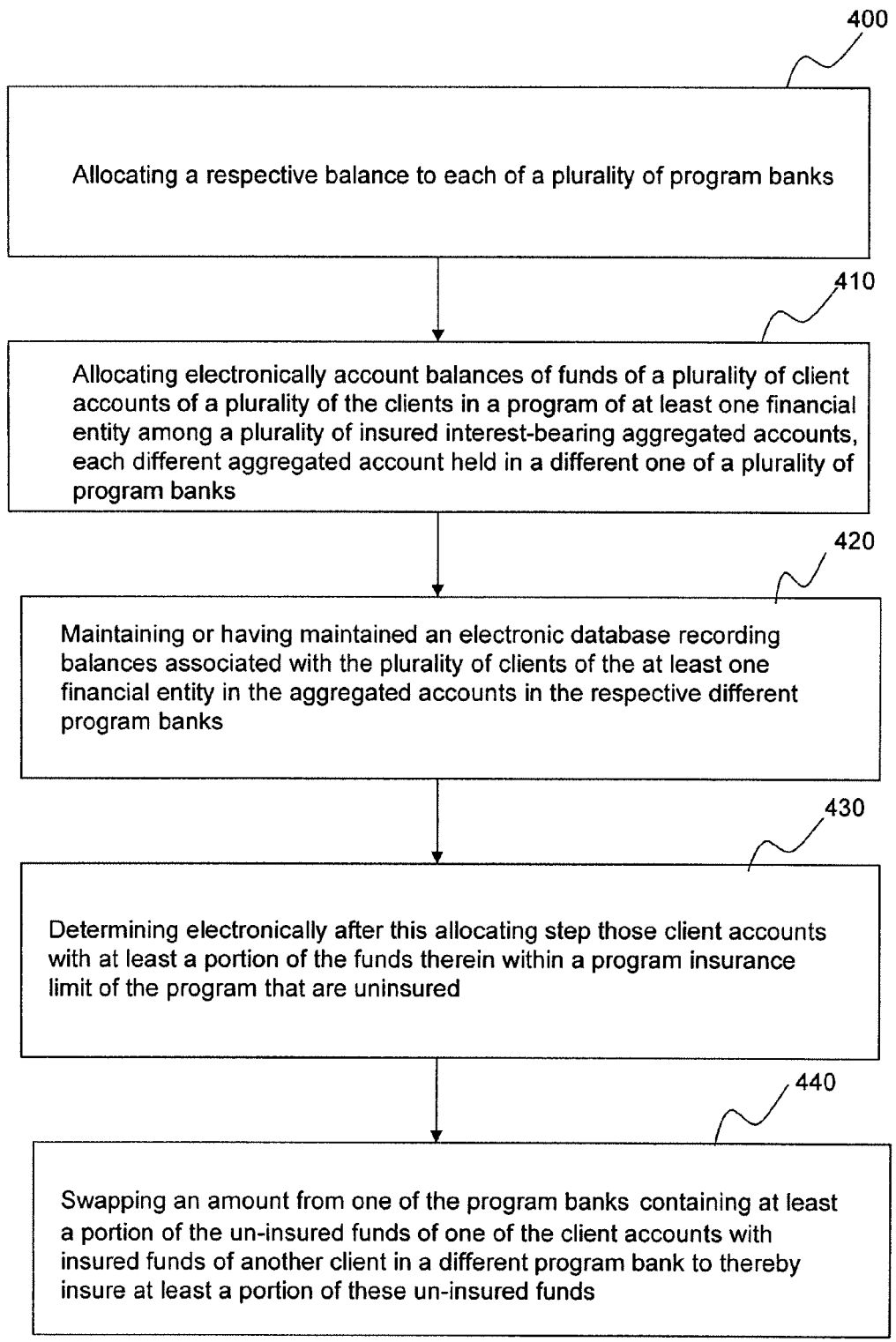
FIG. 4 is schematic block diagram of one embodiment.

Referring now to FIG. 4, there is disclosed yet a further embodiment of a method, system and program product for enhancing safety for funds in aggregated accounts. Block 400 represents a step of allocating a respective balance of funds to each of a plurality of program banks 130-140

Referring to block 410, a step is disclosed of allocating electronically account balances of funds of a plurality of client accounts of a plurality of the clients in a program of at least one financial entity among a plurality of insured interest-bearing aggregated accounts, each different aggregated account held in a different one of the plurality of program banks, wherein in this allocation a respective total amount of funds allocated to each of the respective program banks equals the respective balance allocated to the respective program bank.

Referring to block 420, a step is disclosed of maintaining or having maintained an electronic database 500 (see FIG. 5) for recording balances associated with the plurality of clients of the at least one financial entity in the aggregated accounts in the respective different program banks.

Referring to block 430, a step is disclosed of determining electronically after this allocating step those client accounts with at least a portion of the funds therein within a program insurance limit of the program that are uninsured.

Referring to block 440, a step is disclosed of swapping an amount from one of the program banks 130-140 containing at least a portion of the un-insured funds of one of the client accounts with insured funds of another client in a different program bank to thereby insure at least a portion of these un-insured funds.

Note that the swaps of the present electronic process may be between the hold back bank and other program banks, the safety bank and other program banks or between any two program banks, and may be implemented whether or not eligible client account balances were first distributed across a plurality of the program banks.

Note that one or more processors may be used to implement the units 110, 120 and 130. Also, an electronic database is maintained to record information about each of the received deposits in program banks 130-140, including the source of the deposits, client account data, amounts and any investment data.

Figure 5:
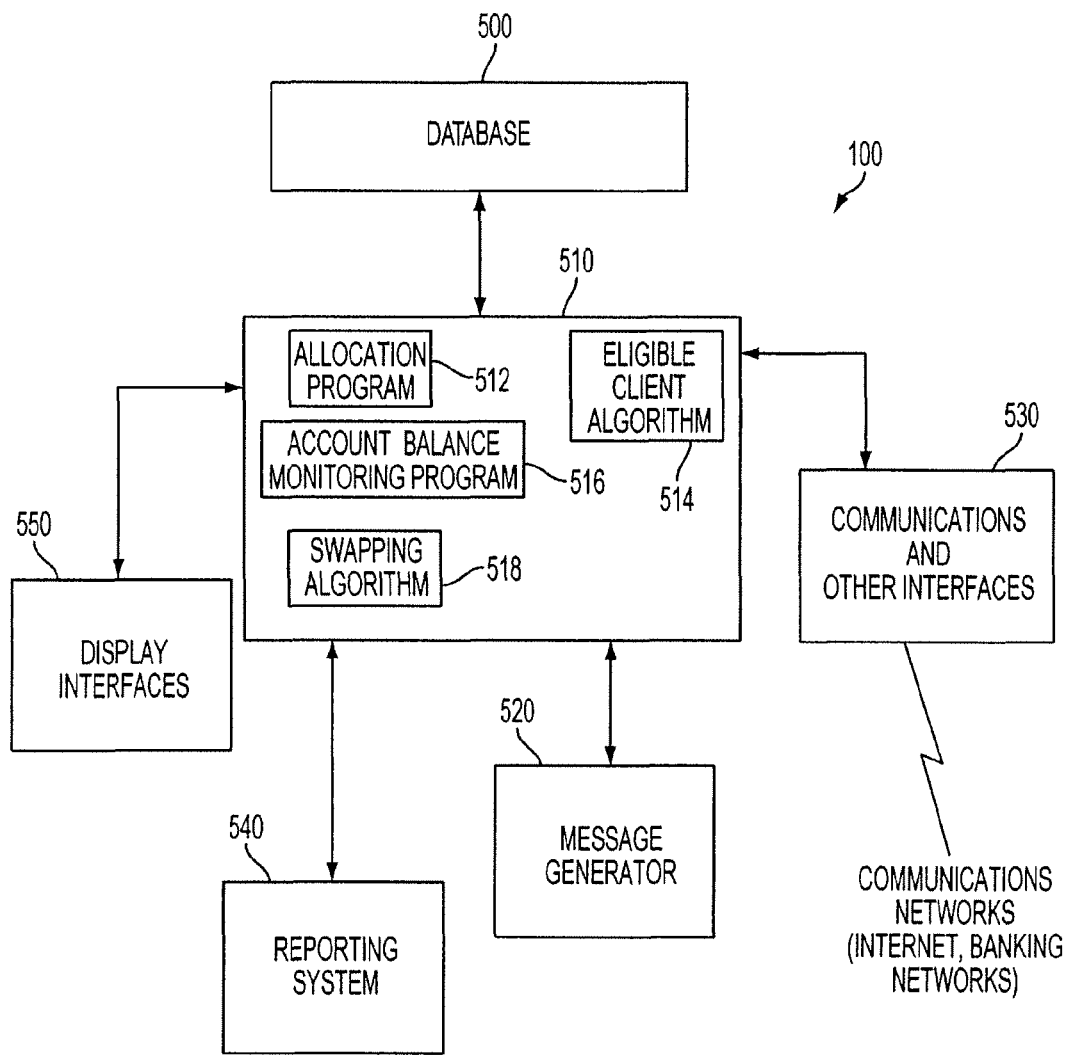
FIG. 5 is a schematic block diagram of an electronic system for implementing one or more of the embodiment of the invention.

FIG. 5 is a block diagram showing an Internet-based aggregated account management system, generally designated by reference number 100, according to an exemplary embodiment of the present invention. It should be appreciated that the aggregated account management system 100 according to the present invention need not be Internet-based, but may instead, for example, be part of a closed network that allows limited access to bank and financial entity records to obtain an enhanced level of security. The management system 100 includes a memory 500, which may be a distributed memory, a CPU 510 for executing a program bank allocation program 512, an eligible client algorithm 314, an account balance monitoring program 516, and a swapping algorithm 518. The CPU 510 executes code to perform the various management functions performed by the management system 100 and these different programs. The management system 100 communicates with the respective computer systems of one or more financial entities, the program banks 130-140, the holdback program bank 110, and the intermediate bank 120 to manage the aggregated accounts held at each program bank to maximize insurance for the money in the various client accounts and/or increase the safety of that money.

The bank allocation program 512 allocates the net of the deposit data and withdrawal data from the sweep files to the aggregated accounts in the program banks and further allocates amounts to the different program banks and allocates account balances to the program banks. The system further includes a message generator 520 that generates one or more messages and settlement wires regarding withdrawal of funds from or deposit of funds to each of the aggregated accounts in the program banks. Messages may, for example, be in the form of e-mail, facsimile, text message or other form of communication. Such messages may be sent to the financial entities and/or the banks for providing notice of an action or request for approval of an action, and may include information such as, for example, the amount withdrawn or deposited and the reason for the withdrawal or deposit.

Additionally, management system 100 may include a reporting system 540 for monitoring and generating reports on various aspects of the operation, including the swap activity and the client account balances deposited in each of the program banks. Additionally, the system 100 may include a display interface 550 with local and/or remote monitoring. Additionally, the management system 100 may include communications and miscellaneous interfaces 530. The communications interface could connect to one or more electronic communications networks.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networked environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed:

1. A method, comprising:

accessing one or more electronic databases stored on one or more computer-readable media, using one or more computers, in performance of the method, the one or more electronic databases comprising:

(1) aggregated deposit account information for a plurality of Federal Deposit Insurance Corporation (FDIC)-insured and interest-bearing aggregated deposit accounts held in a first plurality of banks in a program, wherein funds from client accounts of a plurality of clients are aggregated with funds of other client accounts in the aggregated deposit accounts held in the first plurality of the banks in the program, the aggregated deposit account information for a respective aggregated deposit account comprising a balance of funds held in the respective aggregated deposit account; and (2) client account information for respective client accounts comprising, for respective of the client accounts, a respective balance of client account funds held in each of said plurality of the insured and interest-bearing aggregated deposit accounts that holds funds of the respective client account;

accessing or obtaining, using the one or more computers, first client transaction files comprising one or more transfers to and/or from one or more of the respective client accounts;

determining or having determined or obtaining, using the one or more computers, respective total amounts of funds to be held in a second plurality of the respective banks in the program based on one or more rules;

determining, using the one or more computers, a set of the client accounts having small balances below a first predetermined threshold amount wherein said first threshold amount is less than an FDIC insurance limit for a single account, the set of client accounts referred to as small balance client accounts;

allocating funds of the client accounts, using the one or more computers, among the second plurality of the banks in the program to match the respective total amounts set for the second plurality of the respective banks based at least in part on a rule that funds of the client accounts have FDIC insurance, the allocating funds of the client accounts step comprising allocating the small balance client accounts to force a distribution of respective of the client accounts with balances below the first predetermined threshold amount to respective banks in a third plurality of the banks in the program for the aggregated deposit accounts held therein;

determining or having determined or receiving transfer information, using the one or more computers, to deposit to or to withdraw an amount of funds from one or more of the aggregated deposit accounts based at least in part on the respective total amounts of funds to be held in the second plurality of the respective banks in the program;

receiving after the respective total amounts of funds for the respective second plurality of banks have been determined or obtained, using the one or more computers, one or more second client transaction files comprising client transaction data comprising transfers to and/or from one or more of the respective client accounts;

reallocating funds of multiple of the client accounts, using the one or more computers, in the one or more electronic databases, among the program banks to match the respective total amounts set for the second plurality of the banks in the program based at least in part on the rule that funds of the client accounts have FDIC insurance; and updating or providing data for updating the aggregated account information and the client account information in the one or more databases, using the one or more computers, based at least in part on the respective total amounts of funds to be held in the second plurality of the respective banks and the reallocating of funds of the client accounts.

2. The method as defined in claim 1, further comprising:
transferring or having transferred or recording a transfer of funds, using the one or more computers, to or from one or more of the program banks based at least in part on data in the one or more first client transaction files and the respective total amounts of funds to be held in the respective banks in the program.

3. The method as defined in claim 2, further comprising:
transferring or having transferred or recording a transfer of funds, using the one or more computers, to or from one or more of the program banks that are holdback banks based at least in part on data in the one or more second client transaction files.

4. The method as defined in claim 1, further comprising:
transferring or having transferred or recording a transfer of funds, using the one or more computers, to or from one or more of the program banks that are holdback banks based at least in part on data in the one or more second client transaction files.

5. The method as defined in claim 1, wherein the allocating the small balance client accounts across multiple of the program banks comprises allocating among all of the program banks.

6. The method as defined in claim 1, wherein the allocating the small balance client accounts across multiple of the program banks comprises allocating among all of the program banks except for a subset of the program banks that are holdback and/or safety banks.

7. The method as defined in claim 1, wherein the reallocating step is performed based at least in part on a rule to minimize swapping of client accounts among the program banks.

8. The method as defined in claim 1, wherein the small balance client accounts are distributed substantially equally across all of the plurality of program banks except one or more holdback banks.

9. The method as defined in claim 1, wherein the client transaction files comprises client purchase transaction data and/or client withdrawal transaction data and/or nets thereof.

10. The method as defined in claim 1, wherein the second plurality of banks in the program is equal to the third plurality of the banks in the program.

11. A system, comprising:
one or more computers configured with program code to perform a method comprising the steps:

accessing one or more electronic databases stored on one or more computer-readable media, using the one or more computers, in performance of the method, the one or more electronic databases comprising:

(1) aggregated deposit account information for a plurality of Federal Deposit Insurance Corporation (FDIC)-insured and interest-bearing aggregated deposit accounts held in a first plurality of banks in a program, wherein funds from client accounts of a plurality of clients are aggregated with funds of other client accounts in the aggregated deposit accounts held in the first plurality of the banks in the program, the aggregated deposit account information for a respective aggregated deposit account comprising a balance of funds held in the respective aggregated deposit account; and (2) client account information for respective client accounts comprising, for respective of the client accounts, a respective balance of client account funds held in each of said plurality of the insured and interest-bearing aggregated deposit accounts that holds funds of the respective client account;

accessing or obtaining, using the one or more computers, first client transaction files comprising one or more transfers to and/or from one or more of the respective client accounts;

determining or having determined or obtaining, using the one or more computers, respective total amounts of funds to be held in a second plurality of the respective banks in the program based on one or more rules;

determining, using the one or more computers, a set of the client accounts having small balances below a first predetermined threshold amount wherein said first threshold amount is less than an FDIC insurance limit for a single account, the set of client accounts referred to as small balance client accounts;

allocating funds of the client accounts, using the one or more computers, among the second plurality of the banks in the program to match the respective total amounts set for the second plurality of the respective banks based at least in part on a rule that funds of the client accounts have FDIC insurance, the allocating funds of the client accounts step comprising allocating the small balance client accounts to force a distribution of respective of the client accounts with balances below the first predetermined threshold amount to respective banks in a third plurality of the banks in the program for the aggregated deposit accounts held therein;

determining or having determined or receiving transfer information, using the one or more computers, to deposit to or to withdraw an amount of funds from one or more of the aggregated deposit accounts based at least in part on the respective total amounts of funds to be held in the second plurality of the respective banks in the program;

receiving after the respective total amounts of funds for the respective second plurality of banks have been determined or obtained, using the one or more computers, one or more second client transaction files comprising client transaction data comprising transfers to and/or from one or more of the respective client accounts;

reallocating funds of multiple of the client accounts, using the one or more computers, in the one or more electronic databases, using the one or more computers, among the program banks to match the respective total amounts set for the second plurality of the banks in the program based at least in part on the rule that funds of the first multiple of the client accounts have FDIC insurance; and updating or providing data for updating the aggregated account information and the client account information in the one or more databases, using the one or more computers, based at least in part on the respective total amounts of funds to be held in the second plurality of the respective banks and the reallocating of funds of the client accounts.

12. The system as defined in claim 11, further comprising the one or more computers configured with program code to perform the step:

transferring or having transferred or recording a transfer of funds, using the one or more computers, to or from one or more of the program banks based at least in part on data in the one or more first client transaction files and the respective total amounts of funds to be held in the respective banks in the program.

13. The system as defined in claim 12, further comprising the one or more computers configured with program code to perform the step:

transferring or having transferred or recording a transfer of funds, using the one or more computers, to or from one or more of the program banks that are holdback banks based at least in part on data in the one or more second client transaction files.

14. The system as defined in claim 11, further comprising the one or more computers configured with program code to perform the step:

transferring or having transferred or recording a transfer of funds, using the one or more computers, to or from one or more of the program banks that are holdback banks based at least in part on data in the one or more second client transaction files.

15. The system as defined in claim 11, wherein the allocating the small balance client accounts across multiple of the program banks comprises allocating among all of the program banks.

16. The system as defined in claim 11, wherein the allocating the small balance client accounts across multiple of the program banks comprises allocating among all of the program banks except for a subset of the program banks that are holdback and/or safety banks.

17. The system as defined in claim 11, wherein the reallocating step is performed based at least in part on a rule to minimize swapping of client accounts among the program banks.

18. The system as defined in claim 11, wherein the small balance client accounts are distributed substantially equally across all of the plurality of program banks except one or more holdback banks.

19. The system as defined in claim 11, wherein the client transaction files comprises client purchase transaction data and/or client withdrawal transaction data and/or nets thereof.

20. The system as defined in claim 11, wherein the second plurality of banks in the program is equal to the third plurality of the banks in the program.

* * * * *

UNITED STATES PATENT AND TRADEMARK OFFICE
CERTIFICATE OF CORRECTION

| | | |
|---|---|---|
| PATENT NO. | : 8,380,621 B1 | Page 1 of 1 |
| APPLICATION NO. | : 12/025402 | |
| DATED | : February 19, 2013 | |
| INVENTOR(S) | : Bent et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1130 days.

Signed and Sealed this
Twenty-seventh Day of January, 2015

Michelle K. Lee
*Deputy Director of the United States Patent and Trademark Office*